United States Patent
Watanabe et al.

(10) Patent No.: US 11,180,593 B2
(45) Date of Patent: Nov. 23, 2021

(54) METHACRYLIC RESIN COMPOSITION FOR NON-CONTACT HOT PLATE WELDING, MOLDED ARTICLE, AND METHOD FOR PRODUCING SAME

(71) Applicant: ASAHI KASEI KABUSHIKI KAISHA, Tokyo (JP)

(72) Inventors: Masahiro Watanabe, Tokyo (JP); Katsura Tsujimoto, Tokyo (JP); Kazunori Kozawa, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/386,605

(22) Filed: Apr. 17, 2019

(65) Prior Publication Data

US 2019/0241689 A1  Aug. 8, 2019

Related U.S. Application Data

(62) Division of application No. 15/503,272, filed as application No. PCT/JP2015/074863 on Sep. 1, 2015, now abandoned.

(30) Foreign Application Priority Data

Sep. 11, 2014 (JP) .................. 2014-185492

(51) Int. Cl.

| | | |
|---|---|---|
| *C08F 220/14* | (2006.01) | |
| *C08F 220/10* | (2006.01) | |
| *C08L 33/10* | (2006.01) | |
| *B29C 65/14* | (2006.01) | |
| *B29C 65/20* | (2006.01) | |
| *B29C 65/16* | (2006.01) | |
| *B29C 65/06* | (2006.01) | |
| *B29C 65/82* | (2006.01) | |
| *B29C 65/00* | (2006.01) | |
| *B29L 31/00* | (2006.01) | |
| *B29L 31/30* | (2006.01) | |
| *B29K 33/00* | (2006.01) | |
| *B29K 55/02* | (2006.01) | |
| *B29K 105/00* | (2006.01) | |

(52) U.S. Cl.

CPC ........ *C08F 220/14* (2013.01); *B29C 65/1412* (2013.01); *B29C 65/1432* (2013.01); *B29C 65/20* (2013.01); *B29C 65/8253* (2013.01); *B29C 66/342* (2013.01); *B29C 66/71* (2013.01); *B29C 66/712* (2013.01); *B29C 66/73365* (2013.01); *B29C 66/73921* (2013.01); *C08F 220/10* (2013.01); *C08L 33/10* (2013.01); *B29C 65/06* (2013.01); *B29C 65/16* (2013.01); *B29K 2033/12* (2013.01); *B29K 2055/02* (2013.01); *B29K 2105/0094* (2013.01); *B29K 2995/0088* (2013.01); *B29L 2031/30* (2013.01); *B29L 2031/3008* (2013.01); *B29L 2031/747* (2013.01)

(58) Field of Classification Search

CPC ...... C08F 220/10; C08F 220/14; C08L 33/10; B29C 65/1412; B29C 65/1432; B29C 65/8253; B29C 65/20; B29C 65/16; B29C 65/06; B29C 66/342; B29C 66/71; B29C 66/712; B29C 66/73365; B29C 66/73921; B29L 2031/30

USPC ........................................................ 428/520

See application file for complete search history.

(56) References Cited

U.S. PATENT DOCUMENTS

| 8,617,708 | B2 * | 12/2013 | Murakami | ............ | C08F 2/001 |
|---|---|---|---|---|---|
| | | | | | 428/402 |
| 2006/0285348 | A1 | 12/2006 | Valcamp et al. | | |
| 2009/0239050 | A1 | 9/2009 | Azuma et al. | | |
| 2011/0088843 | A1 | 4/2011 | Wake et al. | | |
| 2011/0094677 | A1 * | 4/2011 | Wake | ............... | B29C 66/71 |
| | | | | | 156/309.9 |
| 2011/0108193 | A1 | 5/2011 | Wake et al. | | |
| 2012/0196127 | A1 * | 8/2012 | Murakami | ............ | C08F 2/001 |
| | | | | | 428/402 |
| 2014/0127521 | A1 | 5/2014 | Ishibashi et al. | | |
| 2015/0299360 | A1 | 10/2015 | Murakami | | |
| 2018/0208694 | A1 | 7/2018 | Watanabe et al. | | |

FOREIGN PATENT DOCUMENTS

| AU | 2003273023 A1 | 5/2004 |
|---|---|---|
| CN | 101948601 A | 1/2011 |
| EP | 2 275 461 A1 | 1/2011 |
| EP | 2492288 A1 | 8/2012 |

(Continued)

OTHER PUBLICATIONS

"Welding of Materials," Welding Handbook. vol. 2, 3rd Version, China Mechanical Engineering Association Welding Society Ed, Machine Industry Publishing House, 2008, pp. 1224-1226, with partial English translation.

International Preliminary Report on Patentability and the English translation of the Written Opinion of the International Searching Authority (Forms PCT/IB/326 PCT/IB/373 and PCT/ISA/237), dated Mar. 23, 2017, for International Application No. PCT/JP2015/074863.

(Continued)

*Primary Examiner* — Michael M. Bernshteyn
(74) *Attorney, Agent, or Firm* — Birch, Stewart, Kolasch & Birch, LLP

(57) ABSTRACT

The present invention provides a methacrylic resin composition for non-contact hot plate welding comprising a methacrylic resin comprising 80 to 99.9% by mass of a methacrylic acid ester monomer unit and 0.1 to 20% by mass of a unit of at least one additional vinyl monomer copolymerizable with the methacrylic acid ester monomer, wherein the methacrylic resin composition has a melt flow rate (MFR) of 2.5 g/10 min or lower at 230° C. at a load of 3.8 kg.

5 Claims, 1 Drawing Sheet

(56) References Cited

FOREIGN PATENT DOCUMENTS

| | | | |
|---|---|---|---|
| JP | 5-247311 A | | 9/1993 |
| JP | 8-302145 A | | 11/1996 |
| JP | 2002-138185 A | | 5/2002 |
| JP | 2004-223909 A | | 8/2004 |
| JP | 2004223909 A | * | 8/2004 |
| JP | 2005-239823 A | | 9/2005 |
| JP | 2005-247311 A | | 9/2005 |
| JP | 2007-506231 A | | 3/2007 |
| JP | 2008-13639 A | | 1/2008 |
| JP | 2009-249529 A | | 10/2009 |
| JP | 2011-148978 A | | 8/2011 |
| JP | 2011-168683 A | | 9/2011 |
| JP | 2011168683 A | * | 9/2011 |
| JP | 2012-12564 A | | 1/2012 |
| JP | 2012012564 A | * | 1/2012 |
| JP | 2012-116062 A | | 6/2012 |
| JP | 2012-214618 A | | 11/2012 |
| JP | 2013-32513 A | | 2/2013 |
| JP | 2013032513 A | * | 2/2013 |
| JP | 2014-51620 A | | 3/2014 |
| JP | 2018-131633 A | | 8/2018 |
| WO | WO 2007/060891 A2 | | 5/2007 |
| WO | WO-2007060891 A2 | * | 5/2007 ............ C08F 265/06 |
| WO | WO 2009/125764 A1 | | 10/2009 |
| WO | WO 2009/125765 A1 | | 10/2009 |
| WO | WO 2009/125768 A1 | | 10/2009 |
| WO | WO 2012/137554 A1 | | 10/2012 |
| WO | WO 2014/061149 A1 | | 4/2014 |
| WO | WO 2016/039226 A1 | | 3/2016 |

OTHER PUBLICATIONS

International Search Report for PCT/JP2015/074863 dated Dec. 1, 2015.
Supplementary European Search Report, dated Jul. 19, 2017, for European Application No. 15840915.1.
Author Unknown, "Plastics hot plate fusion jointing . . . ," 1995, 3 pages total, with an English abstract.
Berg-Feld et al., "Statistics of the formation of ester on syndiotactic methacrylic anhydride-methacrylic acid copolymers," Polymer Bulletin, vol. 16, 1986, pp. 487-492, 6 pages total.
Chinese Office Action and Search Report for Chinese Application No. 202010031340.6, dated Jun. 25, 2021.

\* cited by examiner

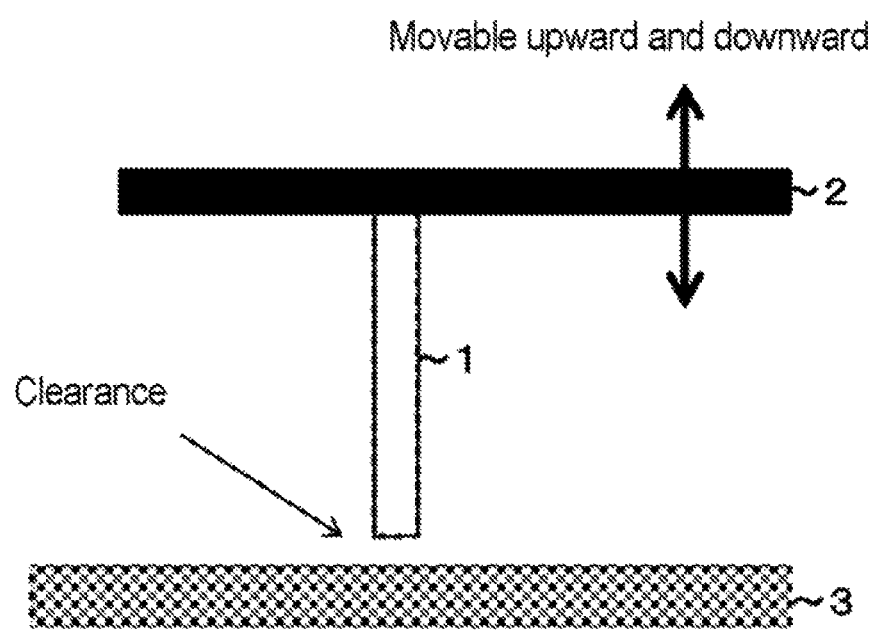

METHACRYLIC RESIN COMPOSITION FOR NON-CONTACT HOT PLATE WELDING, MOLDED ARTICLE, AND METHOD FOR PRODUCING SAME

CROSS-REFERENCE TO RELATED APPLICATION

This application is a Divisional application of co-pending application Ser. No. 15/503,272, filed on Feb. 10, 2017, which is the National Phase under 35 U.S.C. § 371 of International Application No. PCT/JP2015/074863, filed on Sep. 1, 2015, which claims the benefit under 35 U.S.C. § 119(a) to Patent Application No. 2014-185492, filed in Japan on Sep. 11, 2014, all of which are hereby expressly incorporated by reference into the present application.

TECHNICAL FIELD

The present invention relates to a methacrylic resin composition for non-contact hot plate welding, a molded article, and a method for producing the same.

BACKGROUND ART

Methacrylic resin compositions are excellent in transparency and weather resistance and as such, have heretofore been used as raw materials for, for example, members for vehicles such as taillight covers, headlight covers, and meter panels (see e.g., Patent Literatures 1 and 2).

The members for vehicles are prepared by joining a housing member made of, for example, a styrene-based resin such as an ABS resin to a member made of a methacrylic resin composition, followed by processing.

For example, a method using an adhesive, a hot plate welding method, and a vibration welding method are known as methods for joining a styrene-based resin or the like to a member made of a methacrylic resin composition (see e.g., Patent Literature 3).

The hot plate welding method is a method which involves each heating the respective parts to be joined of the members mentioned above in close contact with a hot plate made of a metal so that the parts are melted, followed by the pressure bending of these parts. This method can omit the step of applying an adhesive and the curing time of the adhesive and is therefore excellent in productivity.

On the other hand, the hot plate welding method may cause the phenomenon in which, after the melting with a hot plate made of a metal heated to a predetermined temperature, a portion of the resin composition, when separated from the hot plate, are stretched in a string-like shape without being well detached from the hot plate (so-called stringiness). Such a resin composition may become responsible for poor appearance when used as a raw material for a member for vehicles (see e.g., Patent Literature 4).

CITATION LIST

Patent Literature

Patent Literature 3: Japanese Patent Laid-Open No. 08-302145
Patent Literature 2: Japanese Patent Laid-Open No. 05-247311
Patent Literature 3: Japanese Patent Laid-Open No. 2005-239823
Patent Literature 4: Japanese Patent Laid-Open No. 2009-249529

SUMMARY OF INVENTION

Technical Problem

A method which involves heating the resin composition without being brought into direct contact with the hot plate made of a metal, i.e., in no contact with the hot plate, so that the surface of the resin composition is melted, followed by pressure bonding (non-contact hot plate welding method) is effective for solving the problem of so-called stringiness as mentioned above.

This non-contact hot plate welding method has the advantage that poor appearance such as stringiness is less likely to occur as compared with the hot plate welding method, because the resin is melted by radiation heat from the hot plate.

For the non-contact hot plate welding method, as with the hot plate welding method mentioned above, it is desirable that the respective parts to be joined of the members should be melted in a short time, from the viewpoint of productivity. Therefore, a high hot plate temperature is preferred. In addition, since the resin is melted by radiation heat from the hot plate, the hot plate temperature needs to be on the order of at least 500° C.

Some conventional methacrylic resin compositions, however, may be found to generate bubbles during melting with the hot plate thus heated. Such a resin composition disadvantageously becomes responsible for poor appearance when used as a raw material for the member for vehicles.

Accordingly, an object of the present invention is to provide a methacrylic resin composition for non-contact hot plate welding which is capable of effectively suppressing bubble generation when used in the non-contact hot plate welding method, a molded article comprising the methacrylic resin composition, and a method for producing the same.

Solution to Problem

The present inventors have conducted diligent studies in light of the problems of the conventional techniques mentioned above and consequently completed the present invention by finding that a methacrylic resin composition comprising a methacrylic resin comprising predetermined amounts of a methacrylic acid ester monomer unit and a unit of at least one additional vinyl monomer copolymerizable with the methacrylic acid ester monomer, and having a melt flow rate (MFR) equal to or lower than a particular numeric value at 230° C. at a load of 3.3 kg is less likely to generate bubbles when used in the non-contact hot plate welding method.

Specifically, the present invention is as follows.

[1] A methacrylic resin composition for non-contact hot plate welding comprising a methacrylic resin comprising 80 to 99% by mass of a methacrylic acid ester monomer unit and 0.1 to 20% by mass of a unit of at least one additional vinyl monomer copolymerizable with the methacrylic acid ester monomer, wherein
the methacrylic resin composition has a melt flow rate (MFR) of 2.5 g/10 min or lower at 230° C. at a load of 3.8 kg.

[2] The methacrylic resin composition for non-contact hot plate welding according to the wherein the methacrylic resin is a methacrylic resin which has a weight-average molecular weight of 300000 or lower as measured by gel permeation chromatography (GPC), and contains 6 to 50% of a component having a molecular weight that is 5 times or more lower than a peak top molecular weight (Mp) obtained from a GPC elution curve.

[3] The methacrylic resin composition for non-contact hot plate welding according to the [1] or [2], wherein the methacrylic resin is a methacrylic resin in which an abundance of a component having a molecular weight of 250000 or higher obtained from the GPC elution curve is 12% or more of a GPC area.

[4] The methacrylic resin composition for non-contact hot plate welding according to any one of the [1] to [3], wherein the methacrylic resin has an extrapolated onset temperature (° C.) of 120° C. or lower as determined from a glass transition curve obtained by heating from 40° C. to 210° C. at a heating rate of 10° C./min according to JIS-K-7121 with α-alumina as a reference in a nitrogen gas atmosphere using a differential scanning calorimeter (DSC).

[5] The methacrylic resin composition for non-contact hot plate welding according to any one of the [1] to [4], wherein the methacrylic resin composition is used as a raw material for a member for a vehicle.

[6] The methacrylic resin composition for non-contact hot plate welding according to the [5], wherein the member for the vehicle is at least one member selected from the group consisting of a taillight cover, a headlight cover, and a meter panel.

[7] A molded article comprising a molded article (A) welded with an additional molded article (B), the molded article (A) comprising a methacrylic resin comprising 80 to 99.9% by mass of a methacrylic acid ester monomer unit and 0.1 to 20% by mass of a unit of at least one additional vinyl monomer copolymerizable with the methacrylic acid ester monomer, wherein the molded article (A) has a melt flow rate (MFR) of 2.5 g/10 min or lower at 230° C. at a load of 3.8 kg.

[8] The molded article according to the [7], wherein the methacrylic resin is a methacrylic resin which has a weight-average molecular weight of 300000 or lower as measured by gel permeation chromatography (GPC), and contains 6 to 50% of a component having a molecular weight that is 5 times or more lower than a peak top molecular weight (Mp) obtained from a GPC elution curve.

[9] The molded article according to the [7] or [8], wherein the methacrylic resin is a methacrylic resin in which an abundance of a component having a molecular weight of 250000 or higher obtained from the GPC elution curve is 12% or more of a GPC area.

[10] The molded article according to any one of the [7] to [9], wherein the methacrylic resin has an extrapolated onset temperature (° C.) of 120° C. or lower as determined from a glass transition curve obtained by heating from 40° C. to 210° C. at a heating rate of 10° C./min according to JIS-K-7121 with α-alumina as a reference in a nitrogen gas atmosphere using a differential scanning calorimeter (DSC).

[11] The molded article according to any one of the [7] to [10], wherein the molded article (A) has a water absorption rate of 0.5% by mass or lower.

[12] The molded article according to any one of the [7] to [11], wherein the molded article is used as a raw material for a member for a vehicle.

[13] The molded article according to the [12], wherein the member for the vehicle is at least one member selected from the group consisting of a taillight cover, a headlight cover, and a meter panel.

[14] The molded article according to any one of the [7] to [13], wherein the molded article (B) is a molded article of an ABS-based resin.

[15] A member for a vehicle, comprising the molded article according to any one of the [7] to [14].

[16] The member for the vehicle according to the [15], wherein the member for the vehicle is at least one member selected from the group consisting of a taillight cover, a headlight cover, and a meter panel.

[17] A method for producing a molded article, comprising the steps of:

heating a molded article (A) in no contact with a hot plate so that a surface of the molded article (A) is melted, the molded article (A) comprising a methacrylic resin comprising 80 to 99.9% by mass of a methacrylic acid ester monomer unit and 0.1 to 20% by mass of a unit of at least one additional vinyl monomer copolymerizable with the methacrylic acid ester monomer, wherein the molded article (A) has a melt flow rate (MFR) of 2.5 g/10 min or lower at 230° C. at a load of 3.8 kg; and welding the molded article (A) with an additional molded article (B).

[18] The method for producing the molded article according to the [17], wherein the methacrylic resin is a methacrylic resin which has a weight-average molecular weight of 300000 or lower as measured by gel permeation chromatograph (GPC), and which contains 6 to 50% of a component having a molecular weight that is 5 times or more lower than a peak top molecular weight (Mp) obtained from a GPC elution curve.

[19] The method for producing the molded article according to the [17] or [18], wherein the methacrylic resin is a methacrylic resin in which an abundance of a component having a molecular weight of 250000 or higher obtained from the GPC elution curve is 12% or more of a GPC area.

[20] The method for producing the molded article according to any one of the [17] to [19], wherein the methacrylic resin has an extrapolated onset temperature (° C.) of 120° C. or lower as determined from a glass transition curve obtained by heating from 40° C. to 210° C. at a heating rate of 10° C./min according to JIS-K-7121 with α-alumina as a reference in a nitrogen gas atmosphere using a differential scanning calorimeter (DSC).

[21] The method for producing the molded article according to any one of the [17] to [20], wherein the molded article (A) has a water absorption rate of 0.5% by mass or lower.

[22] The method for producing the molded article according to any one of the [17] to [21], wherein the molded article (B) is a molded article of an ABS-based resin.

Advantageous Effects of Invention

The present invention can provide a methacrylic resin composition for non-contact hot plate welding which can effectively reduce bubble generation when used in the non-contact hot plate welding method, which produces a molded article having the favorable appearance of welded surface, and which is also excellent in flowability in molding.

BRIEF DESCRIPTION OF DRAWINGS

FIG. 1 is a schematic cross-sectional view of a molded article for illustrating the non-contact hot plate welding method.

DESCRIPTION OF EMBODIMENTS

Hereinafter, the mode for carrying out the present invention (hereinafter, referred to as the "present embodiment") will be described in detail. The present embodiment described below is merely given for illustrating the present invention and is not intended to limit the present invention to the contents described below. The present invention can be carried out by making appropriate change or modification without departing from the spirit of the present invention.

In the present specification, each monomer component before polymerization is referred to as an "XX monomer", and the term "monomer" may be omitted.

Also, each constitutional unit constituting a polymer is referred to as an "XX monomer unit" and may be simply referred to as an "XX unit".

Methacrylic Resin Composition for Non-Contact Hot Plate Welding

The methacrylic resin composition for non-contact hot plate welding (hereinafter, also simply referred to as the "methacrylic resin composition") of the present embodiment comprises
a methacrylic resin comprising 80 to 99.9% by mass of a methacrylic acid ester monomer unit and 0.1 to 20% by mass of a unit of at least one additional vinyl monomer copolymerizable with the methacrylic acid ester monomer, wherein
the methacrylic resin composition has a melt flow rate (MFR) of 2.5 g/10 min or lower at 230° C. at a load of 3.8 kg.

Methacrylic Resin

The methacrylic resin contained in the methacrylic resin composition of the present embodiment comprises 80 to 99.9% by mass of a methacrylic acid ester monomer unit and 0.1 to 20% by mass of a unit of at least one additional vinyl monomer copolymerizable with the methacrylic acid ester monomer.

Methacrylic Acid Ester Monomer

The methacrylic acid ester monomer constituting the methacrylic resin is not particularly limited as long as the effects of the present invention can be achieved. Preferred examples thereof include a monomer represented by the following general formula (1):

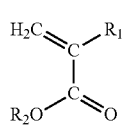

(1)

In the general formula (1), $R_1$ represents a methyl group.
$R_2$ represents a hydrocarbon group having 1 to 18 carbon atoms in which a hydrogen atom on carbon may be replaced with a hydroxy group or a halogen group.

Examples of the methacrylic acid ester monomer include, but are not limited to, butyl methacrylate, ethyl methacrylate, methyl methacrylate, propyl methacrylate, isopropyl methacrylate, isobutyl methacrylate, cyclohexyl methacrylate, phenyl methacrylate, (2-ethylhexyl) methacrylate, (t-butylcyclohexyl) methacrylate, benzyl methacrylate, and (2,2,2-trifluoroethyl) methacrylate. Methyl methacrylate, ethyl methacrylate, or propyl methacrylate is more preferred, and methyl methacrylate is further preferred, from the viewpoint of handling and easy availability.

Only one of these methacrylic acid ester monomers may be used alone, or two or more thereof may be used in combination.

Additional Vinyl Monomer Copolymerizable with Methacrylic Acid Ester Monomer The additional vinyl monomer copolymerizable with the methacrylic acid ester monomer mentioned above, constituting the methacrylic resin contained in the methacrylic resin composition of the present embodiment is not particularly limited as long as the effects of the present invention can be achieved. Preferred examples thereof include an acrylic acid ester monomer represented by the following general formula (2):

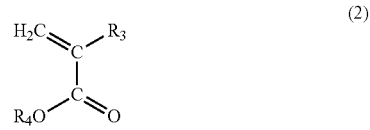

(2)

In the general formula (2), $R_3$ represents a hydrogen atom, and $R_4$ represents a hydrocarbon group having 1 to 18 carbon atoms in which a hydrogen atom on carbon may be replaced with a hydroxy group or a halogen group.

Examples of the acrylic acid ester monomer represented by the general formula (2) include, but are not limited to, methyl acrylate, ethyl acrylate, propyl acrylate, butyl acrylate, isobutyl acrylate, cyclohexyl acrylate, phenyl acrylate, (2-ethylhexyl) acrylate, (t-butylcyclohexyl) acrylate, benzyl acrylate, and (2,2,2-trifluoroethyl) acrylate.

Methyl acrylate, ethyl acrylate, propyl acrylate, isopropyl acrylate, butyl acrylate, isobutyl acrylate, or the like is more preferred, and methyl acrylate is further preferred, from the viewpoint of handling and easy availability.

Examples of the additional vinyl monomer other than the acrylic acid ester monomer of the general formula (2), copolymerizable with the methacrylic acid ester monomer include, but are not limited to: α,β-unsaturated acids such as acrylic acid and methacrylic acid; unsaturated group-containing divalent carboxylic acids such as maleic acid, fumaric acid, itaconic acid, and cinnamic acid, and their alkyl esters; styrene-based monomers such as styrene, o-methylstyrene, m-methylstyrene, p-methylstyrene, 2,4-dimethylstyrene, 2,5-dimethylstyrene, 3,4-dimethylstyrene, 3,5-dimethylstyrene, p-ethylstyrene, m-ethylstyrene, o-ethylstyrene, p-tert-butylstyrene, and isopropenylbenzene (α-methylstyrene); aromatic vinyl compounds such as 1-vinylnaphthalene, 2-vinylnaphthalene, 1,1-diphenylethylene, isopropenyltoluene, isopropenylethylbenzene, isopropenylpropylbenzene, isopropenylbutylbenzene, isopropenylpentylbenzene, isopropenylhexylbenzene, and isopropenyloctylbenzene; vinyl cyanide compounds such as acrylonitrile and methacrylonitrile; unsaturated carboxylic anhydrides such as maleic anhydride and itaconic anhydride; maleimide and N-substituted maleimides such as N-methylmaleimide, N-ethylmaleimide, N-phenylmaleimide, and N-cyclohexylmaleimide; amides such as acrylamide and methacrylamide; ethylene glycol or oligomers thereof whose both terminal hydroxy groups have been esterified with acrylic acid or methacrylic acid, such as ethylene glycol di(meth)acrylate, diethylene glycol di(meth)acrylate, triethylene glycol di(meth)acrylate, and tetraethylene glycol di(meth)acrylate; alcohols whose two hydroxy groups have been esterified with acrylic acid or methacrylic acid, such as neopentyl glycol di(meth)acrylate and di(meth)acrylate; polyhydric alcohol derivatives, such as trimethylolpropane, pentaerythritol, esterified with acrylic acid or methacrylic acid; and polyfunctional monomers such as divinylbenzene.

Only one of these acrylic acid ester monomers represented by the general formula (2) copolymerizable with the methacrylic acid ester monomer or vinyl-based monomers other than the above-listed acrylic acid ester monomers represented by the general formula (2) may be used alone, or two or more thereof may be used in combination.

The content of the unit of the additional vinyl monomer copolymerizable with the methacrylic acid ester monomer mentioned above, constituting the methacrylic resin is 0.1 to 20% by mass in the methacrylic resin.

When the content of the unit of the additional vinyl monomer copolymerizable with the methacrylic acid ester monomer mentioned above is 0.1% by mass or higher, flowability and heat resistance can be improved. When this content is 20% by mass or lower, heat resistance can be enhanced.

The content is preferably 0.1 to 17% by mass, more preferably 0.2 to 15% by mass, further preferably 0.3 to 12% by mass.

For the methacrylic resin, a vinyl-based monomer other than the above-listed vinyl monomers, copolymerizable with the methacrylic acid ester monomer may be appropriately added and copolymerized therewith, for the purpose of improving properties such as heat resistance and processability.

The total amount of the methacrylic acid ester monomer unit and the unit of the vinyl monomer copolymerizable with the methacrylic acid ester is set to 100% by mass.

Properties of Methacrylic Resin

Weight-Average Molecular Weight and Molecular Weight Distribution of Methacrylic Resin The weight-average molecular weight and the molecular weight distribution of the methacrylic resin contained in the methacrylic resin composition of the present embodiment will be described.

The methacrylic resin preferably has a weight-average molecular weight (Mw) of 300000 or lower as measured by GPC (gel permeation chromatography).

For obtaining excellent mechanical strength and solvent resistance, the weight-average molecular weight (Mw) of the methacrylic resin is preferably 50000 or higher, more preferably 60000 or higher, further preferably 70000 or higher, still further preferably 80000 or higher, still further preferably 90000 or higher.

For exerting the favorable flowability of the methacrylic resin, the weight-average molecular weight (Mw) is preferably 300000 or lower, more preferably 250000 or lower, further preferably 230000 or lower, still further preferably 210000 or lower, still further preferably 180000 or lower.

When the weight-average molecular weight of the methacrylic resin falls within the range mentioned above, flowability, mechanical strength, and solvent resistance can be well balanced and favorable molding processability is maintained.

The molecular weight distribution (Mw/Mn) of the methacrylic resin contained in the methacrylic resin composition of the present embodiment is preferably 1.6 to 6.0, more preferably 1.7 to 5.0, further preferably 1.8 to 5.0. When the molecular weight distribution of the methacrylic resin is 1.6 or more and 6.0 or less, the effect of attaining the excellent balance between flowability in the molding process and mechanical strength is obtained.

The weight-average molecular weight (Mw) and the number-average molecular weight (Mn) of the methacrylic resin can be measured by gel permeation chromatography (GPC) and can be specifically measured by a method described in [Examples] mentioned later.

Specifically, a calibration curve is prepared in advance from elution times and weight-average molecular weights using monodisperse standard methacrylic resins that have a known weight-average molecular weight and are available as reagents, and an analytical gel column that elutes high-molecular-weight components first. Subsequently, the weight-average molecular weight (Mw) and the number-average molecular weight (Mn) of a predetermined analyte methacrylic resin can be determined on the basis or the obtained calibration curve. The molecular weight distribution can be calculated from these values.

The number-average molecular weight (Mn) is an average molecular weight per one simple molecule and is defined by the total weight of the system/the number of the molecule in the system.

The weight-average molecular weight (Mw) is defined by an average molecular weight based on weight fraction.

Abundance of Component Having Molecular Weight that is 5 Times or More Lower than Peak Top Molecular Weight (Mp)

In the methacrylic resin, the abundance of a component having a molecular weight that is 5 times or more lower than a peak top molecular weight (Mp) is preferably 6 to 50%, more preferably 8 to 45%, further preferably 10 to 43%, still further preferably 12 to 40%, still further preferably 15 to 38%, from the viewpoint of solvent resistance, flowability in the molding process, and the suppression of bubble generation during non-contact hot plate welding.

In this context, the abundance (%) of the component having a molecular weight that is 5 times or more lower than a peak top molecular weight (Mp) is the ratio of an area corresponding to the component having a molecular weight that is 5 times or more lower than a peak top molecular weight (Mp) to the total area of the GPC elution curve defined as 100%, and can be measured by a method described in [Examples] mentioned later.

The peak top molecular weight (Mp) refers to a weight molecular weight that shows a peak in the GPC elution curve.

When a plurality of peaks are present in the GPC elution curve, a molecular weight at a peak shown by a weight molecular weight with the largest abundance is used as the peak top molecular weight (Mp).

When the abundance of the component having a molecular weight that is 5 times or more lower than a peak top molecular weight (Mp) in the methacrylic resin is 6% or higher, favorable flowability in molding is obtained. When this abundance is 50% or lower, favorable solvent resistance and bubble generation-suppressing effect are obtained.

A minimum amount of a methacrylic resin component having a weight-average molecular weight of 500 or lower is preferred because the generation of foam-like poor appearance called silver is prevented during molding.

Abundance of Component Having Molecular Weight of 250000 or Higher Obtained from GPC Elution Curve In the methacrylic resin contained in the methacrylic resin composition of the present embodiment, the abundance of a component having a molecular weight of 250000 or higher with respect to the total area of the GPC elution curve defined as 100% is preferably 12% or more of the GPC area from the viewpoint of solvent resistance and the suppression of bubble generation during non-contact hot plate welding. This abundance is more preferably 13% or more, further preferably 14% or more.

The abundance of the component having a molecular weight of 250000 or higher in the methacrylic resin can be measured by a method described in [Examples] mentioned later.

Extrapolated Onset Temperature Measured Using Differential Scanning Calorimeter

The methacrylic resin contained in the methacrylic resin composition of the present embodiment preferably has an extrapolated onset temperature (° C.) of 120° C. or lower as determined from a glass transition curve obtained by heating from 40° C. to 210° C. at a heating rate of 10° C./min according to JIS-K-7121 with α-alumina as a reference in a nitrogen gas atmosphere using a differential scanning calorimeter (DSC).

A lower value of the extrapolated onset temperature (° C.) obtained by a measurement method described in [Examples] mentioned later means that easy melting as a resin is more improved. This value influences reduction in uneven melting in no contact with a hot plate or the appearance of welded surface. Thus, the extrapolated onset temperature of the methacrylic resin contained in the methacrylic resin composition of the present, embodiment is preferably 120° C. or lower, more preferably 115° C. or lower, further preferably 113° C. or lower Method for Producing Methacrylic Resin The methacrylic resin contained in the methacrylic resin composition of the present embodiment can be produced by any polymerization method of bulk polymerization, solution polymerization, suspension polymerization, and emulsion polymerization methods. The polymerization method is preferably a bulk polymerization, solution polymerization, or suspension polymerization method, more preferably a suspension polymerization method.

The polymerization temperature can be appropriately selected as an optimum polymerization temperature according to the polymerization method and is preferably 50° C. or higher and 100° C. or lower, more preferably 60° C. or higher and 90° C. or lower.

A polymerization initiator may be used in the production of the methacrylic resin.

Examples of the polymerization initiator include, but are not limited to: organic peroxides such as di-t-butyl peroxide, lauroyl peroxide, stearyl peroxide, benzoyl peroxide, t-butyl peroxyneodecanoate, t-butyl peroxypivalate, dilauroyl peroxide, dicumyl peroxide, t-butyl peroxy-2-ethylhexanoate, 1,1-bis(t-butylperoxy)-3,3,5-trimethylcyclohexane, and 1,1-bis(t-butylperoxy)cyclohexane; and general azo-based radical polymerization initiators such as azobisisobutyronitrile, azobisisovaleronitrile, 1,1-azobis(1-cyclohexanecarbonitrile), 2,2'-azobis-4-methoxy-2,4-azobisisobutyronitrile, 2,2'-azobis-2,4-dimethylvaleronitrile, and 2,2'-azobis-2-methylbutyronitrile, for radical polymerization.

Only one of these polymerization initiators may be used alone, or two or more types thereof may be used in combination.

Any of these radical initiators may be combined with an appropriate reducing agent and used as a redox-based initiator.

The radical polymerization initiator and/or the redox-based initiator is generally used in the range of 0 to 1 part by mass with respect to 100 parts by mass in total of all monomers for use in the polymerization for the methacrylic resin. The amount of the radical polymerization initiator and/or the redox-based initiator used can be appropriately selected in consideration of the temperature at which the polymerization is performed, and the half-life of the polymerization initiator.

In the case of selecting a bulk polymerization method, a cast polymerization method, or a suspension polymerization method as the polymerization method for the methacrylic resin, the polymerization is preferably performed using a peroxide-based polymerization initiator, from the viewpoint of preventing the staining of the methacrylic resin.

Examples of the peroxide-based polymerization initiator include, but are not limited to, lauroyl peroxide, decanoyl peroxide, and t-butyl peroxy-2-ethylhexanoate. Lauroyl peroxide is more preferred.

For performing the polymerization for the methacrylic resin by the solution polymerization method at a high temperature of 90° C. or higher, it is preferred to use, for example, a peroxide or azobis initiator that has a 10-hour half-life temperature of 80° C. or higher and is soluble in an organic solvent used, as the polymerization initiator.

Examples of the peroxide or azobis initiator include, but are not limited to, 1,1-bis(t-butylperoxy)-3,3,5-trimethylcyclohexane, cyclohexane peroxide, 2,5-dimethyl-2,5-di(benzoylperoxy)hexane, 1,1-azobis(1-cyclohexanecarbonitrile), and 2-(carbamoylazo)isobutyronitrile.

For the production of the methacrylic resin, the molecular weight of the methacrylic resin may be controlled without impairing the object of the present invention.

Examples of the method for controlling the molecular weight of the methacrylic resin include, but are not limited to, a method of controlling the molecular weight by using, for example, a chain transfer agent such as alkylmercaptans, dimethylacetamide, dimethylformamide, or triethylamine, and an iniferter such as dithiocarbamates, triphenylmethylazobenzene, or a tetraphenylethane derivative. Alternatively, the molecular weight may be adjusted by adjusting the amounts of these agents added.

The chain transfer agent is preferably alkylmercaptans from the viewpoint of handleability and stability. Examples of the alkylmercaptans include, but are not limited to, n-butylmercaptan, n-octylmercaptan, n-dodecylmercaptan, t-dodecylmercaptan, n-tetradecylmercaptan, n-octadecylmercaptan, 2-ethylhexyl thioglycolate, ethylene glycol dithioglycolate, trimethylolpropane tris(thioglycolate), and pentaerythritol tetrakis(thioglycolate).

These agents can be appropriately added according to the intended molecular weight of the methacrylic resin and are generally used in the range of 0.001 parts by mass to 3 parts by mass with respect to 100 parts by mass in total of all monomers for use in the polymerization for the methacrylic resin.

Other examples of the method for controlling the molecular weight include a method of changing the polymerization method, a method of adjusting the amount of the polymerization initiator, the chain transfer agent or the iniferter mentioned above, etc., and a method of changing various polymerization conditions such as polymerization temperature.

In the methacrylic resin contained in the methacrylic resin composition of the present embodiment, the abundance of a component having a molecular weight of 250000 or higher obtained from the GPC elution curve can also be controlled by the application of these methods for controlling the molecular weight.

Only one of these methods for controlling the molecular weight may be used, or two or more of these methods may be used in combination.

Examples of the method for producing the methacrylic resin in which the abundance of a component having a molecular weight that is 5 times or more lower than a peak top molecular weight (Mp) obtained from a GPC elution curve is in the range of 6 to 50% include a method of melt-blending a low-molecular-weight methacrylic resin and a high-molecular-weight methacrylic resin, and a production method based on a multistage polymerization method.

The method is not particularly limited as long as the abundance of 6 to 50% can be achieved for the component having a molecular weight that is 5 times or more lower than the Mp. A multistage polymerization method is more preferably used from the viewpoint of quality stability.

In the case of using the multistage polymerization method, it is preferred to first use a raw material mixture constituted by a methacrylic acid ester monomer and at least one additional vinyl monomer copolymerizable with the methacrylic acid ester monomer in the first-stage polymerization to produce 5 to 50% by mass of a polymer (I) having a weight.-average molecular weight of 5000 to 50000 as measured by GPC with respect to the whole of the methacrylic resin of interest.

Next, the inside of the polymerization system is kept at a temperature higher than the first-stage polymerization temperature for a given time.

It is preferred to then add a raw material mixture constituted by a methacrylic acid ester monomer and at least one additional vinyl monomer copolymerizable with the methacrylic acid ester monomer in the presence of the polymer (I) and polymerize them to produce 95 to 50% by mass of a polymer (II) having a weight-average molecular weight of 60000 to 350000 with respect to the whole of the methacrylic resin of interest.

The mixing ratio between the polymer (I) having a weight-average molecular weight of 5000 to 50000 as measured by GPC (hereinafter, simply referred to as the polymer (I)) obtained in the first-stage polymerization, and the polymer (II) having a weight-average molecular weight of 60000 to 350000 (hereinafter, simply referred to as the polymer (II)) obtained in the second-stage polymerization by adding a raw material mixture containing a methacrylic acid ester in the presence of the polymer (I) is preferably 5 to 50% by mass of the polymer (I) and 95 to 50% by mass of the polymer (II) from the viewpoint of polymerization stability during production and improvement in the flowability of the methacrylic resin and the mechanical strength of a resin molded article.

The polymer (I)/polymer (II) ratio is more preferably 7 to 47% by mass/93 to 53% by mass, further preferably 10 to 45% by mass/90 to 55% by mass, still further preferably 13 to 43% by mass/87 to 57% by mass, still further preferably 15 to 40% by mass/85 to 60% by mass, in consideration of the balance among polymerization stability, flowability, and the mechanical strength of a molded article.

The polymer (I) is preferably a polymer comprising 80 to 100% by mass of a methacrylic acid ester monomer unit and 0 to 20% by mass of a monomer unit constituted by at least one additional vinyl monomer copolymerizable with the methacrylic acid ester.

The ratios of the monomer units constituting the polymer (I) can be adjusted by controlling the amounts of the monomers added in the polymerization step for the polymer (I) in the multistage polymerization.

In the polymer (I), a smaller amount of the additional vinyl monomer copolymerizable with the methacrylic acid ester is more preferred, and this additional vinyl monomer may not be used.

The weight-average molecular weight of the polymer (I) as measured by GPC is preferably 5000 to 50000, more preferably 10000 to 45000, further preferably 18000 to 42000, still further preferably 20000 to 40000, from the viewpoint of the suppression of problems, such as silver, associated with molding, polymerization stability, and flowability.

The weight-average molecular weight of the polymer (I) can be controlled, as mentioned above, by using a chain transfer agent and an iniferter, adjusting the amounts of these agents, or appropriately changing polymerization conditions.

The polymer (II) is preferably a polymer comprising 80 to 99.9% by mass of a methacrylic acid ester monomer unit and 0.1 to 20% by mass of a monomer unit constituted by at least one additional vinyl monomer copolymerizable with the methacrylic acid ester.

The ratios of the monomer units constituting the polymer (II) can be controlled by adjusting the amounts of the monomers added in the polymerization step for the polymer (II) in the multistage polymerization.

The weight-average molecular weight of the polymer (II) as measured by GPC is preferably 60000 to 350000, more preferably 100000 to 320000, further preferably 130000 to 300000, still further preferably 150000 to 270000, still further preferably 170000 to 270000, from the viewpoint of solvent resistance and flowability.

The abundance of the component having a molecular weight of 250000 or higher in the methacrylic resin contained in the methacrylic resin composition of the present embodiment can foe controlled by adjusting the ratios of the monomer units in the polymer (II) in the multistage polymerization mentioned above, or the weight-average molecular weight of the polymer (II).

The weight-average molecular weight of the polymer (II) can be controlled, as mentioned above, by using a chain transfer agent and an iniferter, adjusting the amounts of these agents, or appropriately changing polymerization conditions.

In the first-stage polymerization step, a methacrylic acid ester monomer is used in polymerization, either alone or together with at least one additional vinyl monomer copolymerizable with the methacrylic acid ester, to produce the polymer (I).

In the second-stage polymerization step, a methacrylic acid ester monomer and at least one additional vinyl-based monomer copolymerizable with the methacrylic acid ester are added in the presence of the polymer (I) to produce the polymer (II). This polymerization method easily compositionally controls each of the polymer (I) and the polymer (II) and can suppress a rise in temperature caused by the generation of polymerization heat during the polymerization and stabilize the internal viscosity of the system.

In this case, the partial polymerization of the composition mixture of the raw materials for the polymer (II) may be started before the completion of the polymerization for the polymer (I). It is more preferred to temporarily perform curing (in this case, to keep the inside of the system at a temperature higher than the polymerization temperature) to complete the polymerization, followed by the addition of the composition mixture of the raw materials for the polymer (II).

The curing in the first stage not only completes the polymerization but can remove or deactivate unreacted monomers, initiator, chain transfer agent, and the like, which therefore have no adverse effect, on the second-stage polymerization. As a result, the weight-average molecular weight of interest can be obtained.

Each polymerization temperature can be appropriately selected as the optimum polymerization temperature for production according to the polymerization method and is preferably 50° C. or higher and 100° C. or lower, more preferably 60° C. or higher and 90° C. or lower.

The polymerization temperatures for the polymer (I) and the polymer (II) may be the same or different.

The temperature reached by elevation for the curing is preferably at least 5° C., more preferably at least 7° C., further preferably at least 10° C., higher than the polymerization temperature for the polymer (I).

The time for which the inside of the system is kept at the temperature is preferably 10 minutes or longer and 180 minutes or shorter, more preferably 15 minutes or longer and 150 minutes or shorter.

Examples of the method for producing the methacrylic resin having an extrapolated onset temperature (° C.) of 120° C. or lower as determined from a glass transition curve obtained by heating from 40° C. to 210° C. at a heating rate of 10° C./min according to JIS-K-7121 with α-alumina as a reference in a nitrogen gas atmosphere using a differential scanning calorimeter (DSC) include a method of adjusting the copolymerization ratio of the additional vinyl monomer copolymerizable with the methacrylic acid ester monomer mentioned above.

Melt Flow Rate of Methacrylic Resin Composition

The methacrylic resin composition for non-contact hot plate welding of the present embodiment has a melt flow rate (MFR) of 2.5 g/10 min or lower, preferably 2.2 g/10 min or lower, more preferably 2.0 g/10 min or lower and 0.1 g/10 min or higher, further preferably 1.5 g/10 min or lower and 0.2 g/10 min or higher, still further preferably 1.3 g/10 min or lower and 0.3 g/10 min or higher, under conditions of 230° C. and a load of 3.8 kg.

When MFR is 2.5 g/10 min or lower, the generation of bubbles, etc., in the methacrylic resin composition is effectively suppressed during melting in the non-contact hot plate welding method.

For controlling the melt flow rate of the methacrylic resin composition for non-contact hot plate welding of the present embodiment to 2.5 g/10 min or lower under conditions of 230° C. and a load of 3.8 kg, an effective method involves, for example, controlling the compositional ratios of the monomer units as mentioned above, or adjusting the molecular weight, the molecular weight distribution, the abundance of the component having a molecular weight that is 5 times or more lower than a peak top molecular weight (Mp), and the abundance of the component having a molecular weight of 250000 or higher.

Other Materials

The methacrylic resin composition of the present embodiment can be used in combination with conventional materials known in the art mentioned later without impairing the effects of the present invention.

Other Resins

Other resins to be used are not particularly limited, and a curable resin and a thermoplastic resin known in the art are preferably used.

Examples of the thermoplastic resin include, but are not limited to, polypropylene-based resins, polyethylene-based resins, polystyrene-based resins, syndiotactic polystyrene-based resins, ABS-based resins (acrylonitrile-butadiene-styrene-based copolymers), methacrylic resins, AS-based resins (acrylonitrile-styrene-based copolymers), BAAS-based resins (butadiene-acrylonitrile-acrylonitrile rubber-styrene-based copolymers, MBS-based resins (methyl methacrylate-butadiene-styrene-based copolymers), AAS-based resins (acrylonitrile-acrylonitrile rubber-styrene-based copolymers), biodegradable resins, polycarbonate-ABS resin alloys, polyalkylene arylate-based resins such as polybutylene terephthalate, polyethylene terephthalate, polypropylene terephthalate, polytrimethylene terephthalate, and polyethylene naphthalate, polyamide-based resins, polyphenylene ether-based resins, polyphenylene sulfide-based resins, and phenol-based resins.

Particularly, AS resins and BAAS resins are preferred for improving flowability, ABS resins and MBS resins are preferred for improving impact resistance, and polyester resins are preferred for improving chemical resistance.

Also, polyphenylene ether-based resins, polyphenylene sulfide-based resins, phenol-based resins, and the like can be expected to produce the effect of improving flame retardance.

Examples of the curable resin include unsaturated polyester resins, vinyl ester resins, diallyl phthalate resins, epoxy resins, cyanate resins, xylene resins, triazine resins, urea resins, melamine resins, benzoguanamine resins, urethane resins, oxetane resins, ketone resins, alkyd resins, furan resins, styrylpyridine resins, silicon resins, and synthetic rubbers.

Only one of these resins may be used alone, or two or more of these resins may be used in combination.

Other Additives that can be Mixed into Methacrylic Resin Composition

The methacrylic resin composition of the present embodiment may contain an additional additive other than other resins mentioned, above without, impairing the object of the present invention.

The methacrylic resin composition of the present embodiment is particularly preferably supplemented with a heat stabilizer, an ultraviolet absorber, and a flame retardant, etc.

Heat Stabilizer

Examples of the heat stabilizer include, but are not limited to, antioxidants such as hindered phenol-based antioxidants and phosphorus-based processing stabilizers. A hindered phenol-based antioxidant is preferred.

Specific examples thereof include pentaerythritol tetrakis (3-(3,5-di-tert-butyl-4-hydroxyphenyl)propionate, thiodiethylenebis(3-(3,5-di-tert-butyl-4-hydroxyphenyl)propionate, octadecyl-3-(3,5-di-tert-butyl -4-hydroxyphenyl) propionate, N,N'-hexane-1,6-diylbis[3-(3,5-di-tert-butyl-4-hydroxyphenylpropionamide, 3,3',3",5,5',5"-hexa-tert-butyl-a,a',a"-(mesitylene -2,4,6-triyl)tri-p-cresol, 4,6-bis (octylthiomethyl)-o-cresol, 4,6-bis(dodecylthiomethyl)-o-cresol, ethylenebis(oxyethylene)bis[3-(5-tert-butyl-4-hydroxy-m-tolyl)propionate, hexamethylenebis[3-(3,5-di-tert-butyl -4-hydroxyphenyl)propionate, 1,3,5-tris(3,5-di-tert-butyl -4-hydroxybenzyl)-1,3,5-triazine-2,4,6(1H,3H, 5H)-trione, 1,3,5-tris[(4-tert-butyl-3-hydroxy-2,6-xylyl) methyl]-1,3,5-triazine-2,4,6(1H,3H,5H)-trione, and 2,6-di-tert-butyl -4-(4,6-bis(octylthio)-1,3,5-triazin-2-ylamine) phenol. Preferred examples of the heat stabilizer include pentaerythritol tetrakis[3-(3,5-di-tert-butyl -4-hydroxyphenyl)propionate.

Ultraviolet Absorber

Examples of the ultraviolet absorber include, but are not limited to, benzotriazole-based compounds, benzotriazine-based compounds, benzoate-based compounds, benzophenone-based compounds, oxybenzophenone-based compounds, phenol-based compounds, oxazole-based compounds, malonic acid ester-based compounds, cyanoacrylate-based compounds, lactone-based compounds, salicylic acid ester-based compounds, and benzoxazinone-based compounds. A benzotriazole-based compound or a benzotriazine-based compound is preferred.

Only one of these ultraviolet absorbers may be used alone, or two or more thereof may be used in combination.

In the case of adding the ultraviolet absorber, its vapor pressure (P) at 20° C. is preferably $1.0 \times 10^{-4}$ Pa or lower, more preferably $1.0 \times 10^{-6}$ Pa or lower, further preferably $1.0 \times 10^{-8}$ Pa or lower, from the viewpoint of molding processability.

The excellent molding processability means that, for example, the ultraviolet absorber is less attached to mold surface during injection molding or is less attached to a roll during film formation.

The ultraviolet absorber attached to a roll might deteriorate, for example, appearance or optical properties due to its attachment to molded article surface and is therefore not preferred when the molded article is used as an optical material.

The melting point (Tm) of the ultraviolet absorber is preferably 80° C. or higher, more preferably 100° C. or higher, further preferably 130° C. or higher, still further preferably 160° C. or higher.

The rate of decrease in the weight of the ultraviolet absorber by heating from 23° C. to 260° C. at a rate of 20° C./min is preferably 50% or less, more preferably 30% or less, further preferably 15% or less, still further preferably 10% or less, still further preferably 5% or less.

Flame Retardant

Examples of the flame retardant include, but are not limited to, cyclic nitrogen compounds, phosphorus-based flame retardants, silicon-based flame retardants, polyhedral oligomeric silsesquioxane or partially cleaved structures thereof, and silica-based flame retardants.

Additional Additive Other than Those Described Above

The methacrylic resin composition for non-contact hot plate welding of the present embodiment can be further supplemented with various additives without impairing the effects of the present invention, from the viewpoint of imparting thereto other properties such as mold release properties, antistatic performance, rigidity, and dimensional stability.

Examples of the additional additives include, but are not limited to: plasticizers such as phthalic acid esters, fatty acid esters, trimellitic acid esters, phosphoric acid esters, and polyesters; mold release agents such as higher fatty acid, higher fatty acid ester, and mono-, di-, or triglycerides of higher fatty acid; antistatic agents such as polyethers, polyether esters, polyether ester amides, alkyl sulfonate, and alkyl benzenesulfonate; stabilizers such as antioxidants and light stabilizers; and others such as flame retardant promoters, curing agents, curing accelerators, conductivity-imparting agents, stress releasers, crystallization accelerators, hydrolysis inhibitors, lubricants, impact modifiers, slidability-improving agents, compatibilizing agents, nucleating agents, toughening agents, strengthening agents, flow adjusters, sensitizing materials, thickeners, antisettling agents, anti-sagging agents, fillers, antifoaming agents, coupling agents, anticorrosive agents, antibacterial or antifungal agents, anti-fouling agents, and conductive polymers.

Method for Producing Methacrylic Resin Composition

The methacrylic resin composition for non-contact hot plate welding of the present embodiment can be produced by mixing the methacrylic resin mentioned above and other optional materials.

A conventional method known in the art can be used as a kneading method for mixing the methacrylic resin with other resins, various additives, and the like mentioned above, without particular limitations.

For example, a kneading machine such as an extruder, a heat roll, a kneader, a roller mixer, or a Banbury mixer can be used in the kneading for production. Among them, kneading using an extruder is preferred in terms of productivity.

The kneading temperature can follow the preferred processing temperatures of the methacrylic resin constituting the thermoplastic resin composition of the present embodiment and other resins to be mixed therewith and is in the range of preferably 140 to 300° C., more preferably 160 to 290° C., further preferably 180 to 280° C.

Purpose of Methacrylic Resin Composition for Non-Contact Hot Plate Welding

The methacrylic resin composition for non-contact hot plate welding of the present embodiment can be suitably used for any purpose as long as the non-contact hot plate welding method is used for the purpose.

Examples of the purpose include, but are not limited to, household goods, office automation equipment, audiovisual equipment, cell or electrical components, lighting equipment, vehicle purposes, housing purposes, sanitary purposes, amusement machines using elastic balls, liquid-crystal displays, lenses, and touch panels. Also, the methacrylic resin composition of the present embodiment can be suitably used in, for example, transparent substrates for use in solar cells. In addition, the methacrylic resin composition of the present embodiment can also be used in waveguides, lenses, optical fibers, covering materials for optical fibers, LED lenses, lens covers, and the like in the fields of optical communication systems, optical switching systems, and optical measurement systems.

The methacrylic resin composition of the present embodiment is particularly suitable for a member for vehicles required to have favorable appearance traits and, specifically, preferably used in bumpers, radiator grills, visors, taillight covers, headlight covers, and meter panels, etc.

These members may be appropriately subjected to, for example, surface functionalization treatment such as hard coat treatment, antireflection treatment, transparent conducting treatment, electromagnetic cutoff treatment, or gas barrier treatment.

Molded Article

The molded article of the present embodiment comprises a molded article (A) welded with an additional molded article (B), the molded article (A) comprising a methacrylic resin comprising 80 to 99.9% by mass of a methacrylic acid ester monomer unit and 0.1 to 20% by mass of a unit of at least one additional vinyl monomer copolymerizable with the methacrylic acid ester monomer, wherein the molded article (A) has a melt flow rate (MFR) of 2.5 g/10 min or lower at 230° C. at a load of 3.8 kg.

The molded article (A) constituting the molded article of the present embodiment can be produced by molding the methacrylic resin composition of the present embodiment containing the methacrylic resin mentioned above.

The methacrylic resin contained in the molded article (A) preferably has a weight-average molecular weight of 300000 or lower as measured by gel permeation chromatography (GPC) and contains 6 to 50% of a component having a molecular weight that is 5 times or more lower than a peak top molecular weight (Mp) obtained from a GPC elution curve, as described in the paragraph (Methacrylic resin).

In the methacrylic resin contained in the molded article (A), an abundance of a component having a molecular weight of 250000 or higher obtained from the GPC elution curve is preferably 12% or more of a GPC area, as described in the paragraph (Methacrylic resin).

The methacrylic resin contained in the molded article (A) preferably has an extrapolated onset temperature (° C.) of 120° C. or lower as determined from a glass transition curve obtained by heating from 40° C. to 210° C. at a heating rate of 10° C./min according to JIS-K-7121 with α-alumina as a reference in a nitrogen gas atmosphere using a differential scanning calorimeter (DSC), as described in the paragraph (Methacrylic resin).

Water Absorption Rate of Molded Article (A)

The water absorption rate of the molded article (A) is preferably 0.5% by mass or lower.

The methacrylic resin is a water-absorbing resin. Therefore, the water absorption rate of the molded article of the methacrylic resin composition varies depending on the management state of the molded article.

Too high water absorption rate of the molded article (A) in the production of the molded article of the present embodiment by non-contact hot plate welding might induce bubble generation during the welding. Depending on the management state, it is therefore preferred to control the water absorption rate.

For obtaining the stable water absorption rate in any management state, it is preferred to perform humidity control under predetermined conditions after drying for a given time.

The water absorption rate of the molded article (A) is preferably 0.5% by mass or lower as described above, more preferably 0.4% by mass or lower, further preferably 0.3% by mass or lower. Also, the water absorption rate of the molded article (A) is preferably 0.001% by mass or higher, more preferably 0.005% by mass or higher, further preferably 0.01% by mass or higher.

The non-contact hot plate welding method may be carried out by drying the molded article (A) and performing humidify control so that the water absorption rate of the molded article (A) is adjusted to 0.5% by mass or lower. In such a case, bubble generation tends to be further suppressed.

The water absorption rate of 0.001% by mass or higher is preferred because the water absorption rate is easily adjusted.

Examples of the method for adjusting the water absorption rate include a method which involves drying methacrylic resin pellets at 80° C. for 3 hours and then performing a molding process at a predetermined temperature, followed by humidity control for 48 hours under conditions of 23° C. and 50% RH.

Any method may be used as a method for measuring the water absorption rate as long as the method is a general measurement method. Examples thereof include Karl Fischer measurement and measurement using a moisture meter.

Purpose of Molded Article

Examples of the purpose of the molded article of the present embodiment include, but are not limited to, household goods, office automation equipment, audiovisual equipment, cell or electrical components, lighting equipment, vehicle purposes, housing purposes, sanitary purposes, amusement machines using elastic balls, liquid-crystal displays, lenses, and touch panels. Also, the molded article of the present embodiment can be suitably used in, for example, transparent substrates for use in solar cells.

In addition, the molded article of the present embodiment can also be used in waveguides, lenses, optical fibers, covering materials for optical fibers, LED lenses, lens covers, and the like in the fields of optical communication systems, optical switching systems, and optical measurement systems.

The molded article of the present embodiment is particularly suitable for a member for vehicles required to have favorable appearance traits and, specifically, preferably used in bumpers, radiator grills, visors, taillight covers, headlight covers, and meter panels, etc.

These members may be appropriately subjected to, for example, surface functionalization treatment such as hard coat treatment, antireflection treatment, transparent conducting treatment, electromagnetic cutoff treatment, or gas barrier treatment.

Method for Producing Molded Article

Examples of the method for obtaining the molded article (A) by molding the methacrylic resin composition of the present embodiment include, but are not limited to, molding methods in a melted state, such as injection molding, sheet molding, blow molding, injection blow molding, inflation molding, T-die molding, press molding, and extrusion molding. A fabricating method such as pressure forming or vacuum forming can also be used.

Alternatively, an applicable method involves producing the methacrylic resin composition by kneading using a kneading machine such as a heat roll, a kneader, a Banbury mixer, or an extruder, followed by cooling, pulverization, and molding by transfer molding, injection molding, compression molding, or the like.

The order in which each of the components contained in the methacrylic resin composition is mixed is not particularly limited as long as the method can achieve the effects of the present invention.

The additional molded article (B) other than the molded article (A), constituting the molded article of the present embodiment can also be produced by molding in the same way as in the molded article (A) using a conventional resin known in the art, for example, an ABS-based resin.

The method for producing the molded article of the present embodiment comprises the steps of:

heating a molded article (A) in no contact with a hot plate so that a surface of the molded article (A) is melted, the molded article (A) comprising a methacrylic resin comprising 80 to 99.9% by mass of a methacrylic acid ester monomer unit and 0.1 to 20% by mass of a unit of at least one additional vinyl monomer copolymerizable with the methacrylic acid ester monomer, wherein the molded article (A) has a melt flow rate (MFR) of 2.5 g/10 min or lower at 230° C. at a load of 3.8 kg; and welding the molded article (A) with an additional molded article (B).

A molded article of the methacrylic resin composition of the present embodiment can be used as the molded article (A), and a molded article of a conventional resin known in the art can be used as the molded article (B). For example, a molded article of an ABS-based resin is preferably used as the molded article (B).

Stainless, iron, aluminum, copper, or the like can be used as the hot plate though the hot plate is not limited thereto.

Stainless is preferred from the viewpoint of durability, heat resistance, and heat conductivity.

The temperature of the hot plate is preferably 350° C. to 800° C., more preferably 400° C. to 700° C., further preferably 450° C. to 600° C.

Examples of the method for heating the molded article (A) in no contact with a hot plate so that its surface is melted include a method using a heater and a high-frequency induction heating method.

Examples of the method for welding the molded article (A) with an additional molded article (B) include the method of the present invention as well as contact hot plate welding, vibration welding, laser welding, and hot-melt adhesion. The non-contact hot plate welding method is preferred in terms of weld appearance.

The methacrylic resin contained in the molded article (A) is preferably a methacrylic resin which has a weight-average molecular weight of 300000 or lower as measured by gel permeation chromatography (GPC) and contains 6 to 50% of a component having a molecular weight that is 5 times or more lower than a peak top molecular weight (Mp) obtained from a GPC elution curve, as described in the paragraph (Methacrylic resin).

The methacrylic resin contained in the molded article (A) is preferably a methacrylic resin in which the abundance of a component having a molecular weight of 250000 or higher obtained from the GPC elution curve is 12% or more of the GPC area, as described in the paragraph (Methacrylic resin).

The methacrylic resin contained in the molded article (A) preferably has an extrapolated onset temperature (° C.) of 120° C. or lower as determined from a glass transition curve obtained by heating from 40° C. to 210° C. at a heating rate of 10° C./min according to JIS-K -7121 with α-alumina as a reference in a nitrogen gas atmosphere using a differential scanning calorimeter (DSC), as described in the paragraph (Methacrylic resin).

The molded article (A) preferably has a water absorption rate of 0.5% by mass or lower as described in the paragraph (Water absorption rate of molded article (A)).

EXAMPLES

Hereinafter, the present embodiment will be described with reference to specific Examples and Comparative Examples. However, the present, embodiment is not intended to be limited by Examples mentioned later.

Raw Materials Used in Examples and Comparative Examples

Methyl methacrylate (MMA): manufactured by Asahi Kasei Chemicals Corp. (supplemented with 2.5 ppm of 2,4-dimethyl -6-tert-butylphenol manufactured by CBC Co., Ltd. as a polymerization inhibitor)
Methyl acrylate (MA): manufactured by Mitsubishi Chemical Corp. (supplemented with 14 ppm of 4-methoxyphenol manufactured by Kawaguchi Chemical Industry Co., Ltd. as a polymerization inhibitor)
Ethyl acrylate (EA): manufactured by Mitsubishi Chemical Corp.
Styrene (St): manufactured by Asahi Kasei Chemicals Corp.
N-Phenylmaleimide (N-PhMI): manufactured by Nippon Shokubai Co., Ltd.
n-Octylmercaptan: manufactured by Arkema, Inc.
2-Ethylhexyl thioglycolate: manufactured by Arkema, Inc.
Lauroyl peroxide: manufactured by NOF Corp.
Calcium phosphate: manufactured by Nippon Chemical Industrial Co., Ltd., used as a suspending agent
Calcium carbonate: manufactured by Shiraishi Kogyo Kaisha, Ltd., used as a suspending agent
Sodium lauryl sulfate: manufactured by Wako Pure Chemical Industries, Ltd., used as a suspension aid Measurement Method I. Composition of Methacrylic Resin and Measurement of Molecular Weight 1. Compositional Analysis of Methacrylic Resin The compositional analysis of the methacrylic resin was conducted by pyrolysis gas chromatography and mass spectrometry.

Pyrolysis apparatus: Py-2020D manufactured by Frontier Laboratories Ltd.
Column: DB-1 (length: 30 m, inside diameter: 0.25 mm, liquid-phase thickness: 0.25 μm)
Column temperature program: kept at 40° C. for 5 min, then heated to 320° C. at a rate of 50° C./min, and kept at 320° C. for 4.4 min
Pyrolytic furnace temperature: 550° C.
Column inlet temperature: 320° C.

Gas chromatography: GC6890 manufactured by Agilent Technologies, Inc.

Carrier: pure nitrogen, flow rate: 1.0 mL/min

Injection method: split method (split ratio: 1/200)

Detector: mass spectrometer Automass Sun manufactured by JEOL Ltd.

Detection method: electron impact ionization method (ion source temperature: 240° C., interface temperature: 320° C.)

Sample: 10 μL of a solution of 0.1 g of the methacrylic resin in 10 cc of chloroform The sample was collected into a platinum sample cup for the pyrolysis apparatus and dried in vacuum at 150° C. for 2 hours. Then, the sample cup was placed in the pyrolytic furnace, followed by the compositional analysis of the sample under the conditions described above.

The compositional ratio of the methacrylic resin was determined on the basis of the peak areas of methyl methacrylate and methyl acrylate on total ion chromatography (TIC) and a calibration curve of standard samples given below.

Preparation of standard samples for the calibration curve: 0.25% by mass of lauroyl peroxide and 0.25% by mass of n-octylmercaptan were added to 50 g each of a total of 5 solutions having a ratio between methyl methacrylate and methyl acrylate of (methyl methacrylate/methyl acrylate)= (100% by mass/0% by mass), (98% by mass/2% by mass), (94% by mass/6% by mass), (90% by mass/10% by mass), and (80% by mass/20% by mass), respectively. Each of these mixed solutions was placed in a 100-mL glass ampule, which was sealed after replacement of air with nitrogen.

The glass ampule was placed in a water bath of 80° C. for 3 hours and then in an oven of 150° C. for 2 hours.

After cooling to room temperature, the glass was broken, and the methacrylic resin was taken out thereof and subjected to the compositional analysis.

A graph of (Area value of methyl acrylate)/(Area value of methyl methacrylate+Area value of methyl acrylate) obtained by the measurement of the standard samples for the calibration curve and the charging ratio of methyl acrylate was used as the calibration curve.

Also, the ratios of ethyl acrylate, styrene, and N-phenyl-maleimide used as raw materials for the methacrylic resin were compositionally analyzed in the same way as in the use of methyl acrylate as a raw material as mentioned above.

2. Methods for Measuring Mw of Methacrylic Resin, Abundance of Component Having Molecular Weight that was 5 Times or More Lower than Mp, and Abundance of Component Having Molecular Weight of 250000 or Higher The weight-average molecular weight (Mw) of the methacrylic resin and the abundances of a component, having a molecular weight that was 5 times or more lower than a peak top molecular weight (Mp) and a component having a molecular weight of 250000 or higher were measured using an apparatus and conditions given below.

Measurement apparatus; gel permeation chromatography (HLC-8320GPC) manufactured by Tosho Corp.

Column: one TSKgel SuperH2500 column, two TSKgel SuperHM-M columns, and one TSK guard column SuperH-H column connected in series These columns elute high-molecular-weight components first and elute low-molecular-weight components late.

Detector: RI (differential refractive) detector

Detection sensitivity: 3.0 mV/min

Column temperature: 40° C.

Sample: a solution of 0.02 g of methacrylic resin in 10 mL of tetrahydrofuran

Injection volume: 10 μL

Developing solvent: tetrahydrofuran, flow rate: 0.6 μL/min

Ten monodisperse polymethyl methacrylates having a known weight peak molecular weight and differing in molecular weight (Polymethyl methacrylate Calibration Kit PL2020-0101 M-M-10) given below were used as standard samples for the calibration curve.

Since the polymethyl methacrylates used as the standard samples for the calibration curve each show a single peak, (Mp) was indicated as a peak molecular weight and distinguished from the term "peak top molecular weight" when plurality of peaks were present.

|  | Peak molecular weight (Mp) |
| --- | --- |
| Standard sample 1 | 1,916,000 |
| Standard sample 2 | 625,500 |
| Standard sample 3 | 298,900 |
| Standard sample 4 | 138,600 |
| Standard sample 5 | 60,150 |
| Standard sample 6 | 27,600 |
| Standard sample 7 | 10,290 |
| Standard sample 8 | 5,000 |
| Standard sample 9 | 2,810 |
| Standard sample 10 | 850 |

RI detection intensity at the elution time of the methacrylic resin was measured under the conditions described above.

The weight-average molecular weight (Mw) of the methacrylic resin, the abundance (%) of the component having a molecular weight that was 5 times or more lower than a GPC peak top molecular weight (Mp), and the abundance (%) of the component having a molecular weight of 250000 or higher were determined on the basis of areas in the GPC elution curve and the calibration curve of the approximate equation of the 7th order.

II. Physical Property Measurement

1. Method for Measuring Melt Flow Rate (MFR)

The melt flow rate of the methacrylic resin composition was measured at 230° C. at a load of 3.8 kg for 10 minutes according to ISO1133.

2. Evaluation by Non-Contact Hot Plate Welding Method (Method for Measuring Bubble Generation)

An evaluation test by the non-contact hot plate welding method will be described with reference to FIG. 1.

FIG. 1 shows a schematic diagram of one example of the evaluation test by the non-contact hot plate welding method.

The evaluation by the non-contact hot plate welding method shown in FIG. 1 employed methacrylic resins produced in <Production Examples 1 to 11> mentioned later.

First, a molded article having a strip shape of 127 mm in long side×12.7 mm in short side×3.2 mm in thickness was formed from each of the methacrylic resins of Production Examples 1 to 11, followed by humidity control for 48 hours under conditions of 23° C. and 50% RH to obtain test specimen 1.

Then, as shown in FIG. 1, test specimen 1 was placed in movable fixture 2 capable of moving in the upward and downward directions (in FIG. 1, directions indicated by the arrows), then moved close to hot plate 3 heated to 520° C. with a clearance of 0.4 mm via the movable fixture 2, and left standing for 20 seconds. Bubble generation was evaluated.

The bubble generation was evaluated according to the following criteria for the visual evaluation:

⊚: No bubble was visually confirmed.

○: Small bubbles having a diameter of 1 mm or smaller were visually confirmed to a small extent, but no large bubble having a diameter larger than 1 mm was visually confirmed.

×: Bubbles having a diameter larger than 1 mm were visually confirmed.

3. Measurement of Spiral Length

A test was conducted to determine relative flowability on the basis of the distance flown by each resin in a spiral cavity having a constant cross-sectional area.

Injection molding machine: IS-100EN manufactured by Toshiba Machine Co., Ltd.

Mold for measurement: a mold in which a groove having a depth of 2 mm and a width of 12.7 mm was cut in an Archimedes spiral shape on the surface of the mold from the central portion of the surface Injection Conditions Resin temperature: 250° C.

Mold temperature: 60° C.

Injection pressure: 98 MPa

Injection time: 20 sec

The resin was injected to the central portion of the mold surface under the conditions described above.

20 seconds after the completion of the injection, the spiral molded product was taken out of the mold, and the length of the spiral portion was measured. This value was used as an index for the evaluation of flowability in the molding process.

4. Method for Measuring Resistance to Thermal Decomposition

To evaluate resistance to thermal decomposition, the rate of decrease in mass (%) after 8 to 15 mg of a measurement sample which was kept at 270° C. in a nitrogen atmosphere for 30 minutes was measured using TG-DTA 8120 (thermogravimeter and differential thermal analyzer, manufactured by Rigaku Co., Ltd.).

A sample having a smaller absolute value of the rate of decrease in mass was evaluated as having better resistance to thermal decomposition.

The measurement sample used was each of molded articles produced in Examples and Comparative Examples mentioned later.

5. Method for Evaluating Meltability of Methacrylic Resin in No Contact with Hot Plate In the method for evaluating the meltability of the methacrylic resin, the extrapolated onset temperature (° C.) was determined from a glass transition curve obtained by the heating of approximately 10 mg of a sample from 40° C. to 210° C. at a heating rate of 10° C./min according to JIS-K-7121 with α-alumina as a reference in a nitrogen gas atmosphere using a differential scanning calorimeter (Diamond DSC manufactured by PerkinElmer Japan Co., Ltd.).

6. Evaluation of Welded Surface

A molded article having a strip shape of 127 mm in long side×12.7 min in short side×3.2 mm in thickness was prepared using an ABS-based resin manufactured by Asahi Kasei Chemicals Corp. The end face of a molded specimen of the methacrylic resin melted by the method of <2. Evaluation by non-contact hot plate welding (method for measuring bubble generation)> mentioned above was welded with the ABS-based resin. The weld appearance was visually evaluated according to the criteria given below.

Since the methacrylic resin was transparent, the welded surface was confirmed from the methacrylic molded article side.

○: The roughness of the welded surface was able to be hardly confirmed.

Δ: The roughness of the welded surface was able to be slightly confirmed.

×: The roughness of the welded surface was able to be confirmed.

7. Method for Measuring Water Absorption Rate of Molded Article

A portion of test specimen 1 produced according to the paragraph <2. Evaluation by non-contact hot plate melting method (method for measuring bubble generation)> was cut out, and its water absorption rate was measured in terms of % by mass using a moisture meter FM-300 (manufactured by Kett Electric Laboratory). Measurement conditions will be described below.

Measurement principle: reference drying method by heating Temperature: 210±5° C.

Nitrogen flow rate: 350±50 ml/min

Production Examples of Methacrylic Resin

The methacrylic resin used was each of resins (A-1) to (A-11) produced by Production Examples 1 to 11 described below.

Production Example 1

A container having a stirrer was charged with 2 kg of ion-exchange water, 65 g of calcium phosphate, 39 g of calcium carbonate, and 0.39 g of sodium lauryl sulfate to obtain a mixed solution (a).

Subsequently, a 60-L reactor was charged with 26 kg of ion-exchange water, heated to 80° C., and charged with the mixed solution (a) and 21.2 kg of methyl methacrylate, 0.43 kg of methyl acrylate, 27 g of lauroyl peroxide, and 62 g of n-octylmercaptan.

Then, suspension polymerization was performed with the temperature kept at approximately 80° C. After observation of an exothermic peak, the temperature was raised to 92° C. at a rate of 1° C./min, and the polymer was aged for 60 minutes to substantially terminate the polymerization reaction.

Subsequently, the reactor was cooled to 50° C. and charged with 20% by mass of sulfuric acid for the dissolution of the suspending agent. Then, the polymerization reaction solution was sifted through a 1.68-mm mesh sieve to remove aggregates. The obtained polymer in the form of beads was subjected to washing, dehydration, and drying treatments to obtain fine polymer particles.

The obtained fine polymer particles were melt-kneaded in a ϕ30 mm twin-screw extruder set to 230° C., and the strands were cooled and cut to obtain methacrylic resin pellets (A-1).

The obtained methacrylic resin pellets had a compositional ratio of MMA/MA=98.0/2.0 wt %, Mw of 102000, and MFR of 2.1 g/10 min.

The abundance (%) of the component having a molecular weight that was 5 times or more lower than Mp was 4.5%, and the abundance (%) of the component having a molecular weight of 250000 or higher was 5.0%.

The rate of decrease in mass (%) in the TG-DTA measurement was 2.0%, and the extrapolated onset temperature (° C.) in the DSC measurement was 110.5° C.

Production Example 2

A container having a stirrer was charged with 2 kg of ion-exchange water, 65 g of calcium phosphate, 39 g of calcium carbonate, and 0.39 g of sodium lauryl sulfate to obtain a mixed solution (b).

Subsequently, a 60-L reactor was charged with 23 kg of ion-exchange water, heated to 80° C., and charged with the mixed solution (b) and 5.5 kg of methyl methacrylate, 40 g of lauroyl peroxide, and 90 g of 2-ethylhexyl thioglycolate.

Then, suspension polymerization was performed with the temperature kept at approximately 80° C. After observation of an exothermic peak, the temperature was raised to 92° C. at a rate of 1° C./min, and the temperature of 92° C. to 94° C. was maintained for 30 minutes. Then, the temperature was dropped to 80° C. at a rate of 1° C./min. Subsequently, the reactor was charged with 16.2 kg of methyl methacrylate, 0.75 kg of methyl acrylate, 21 g of lauroyl peroxide, and 17.5 g of n-octylmercaptan. Subsequently, suspension polymerization was performed with the temperature kept at approximately 80° C.

After observation of an exothermic peak, the temperature was raised to 92° C. at a rate of 1° C./min, and the polymer was then aged for 60 minutes to substantially terminate the polymerization reaction.

Subsequently, the reactor was cooled to 50° C. and charged with 20% by mass of sulfuric acid for the dissolution of the suspending agent. Then, the polymerization reaction solution was sifted through a 1.68-mm mesh sieve to remove aggregates. The obtained polymer in the form of beads was subjected to washing, dehydration, and drying treatments to obtain fine polymer particles.

The obtained fine polymer particles were melt-kneaded in a φ30 mm twin-screw extruder set to 240° C., and the strands were cooled and cut to obtain methacrylic resin pellets (A-2).

The obtained methacrylic resin pellets had a compositional ratio of MMA/MA=96.7/3.3 wt %, Mw of 172000, and MFR of 0.53 g/10 min.

The abundance (%) of the component having a molecular weight that was 5 times or more lower than Mp was 24.5%, and the abundance (%) of the component having a molecular weight of 250000 or higher was 23%.

The rate of decrease in mass (%) in the TG-DTA measurement was 2.3%, and the extrapolated onset temperature (° C.) in the DSC measurement was 107.1° C.

Production Example 3

A container having a stirrer was charged with 2 kg of ion-exchange water, 65 g of calcium phosphate, 39 g of calcium carbonate, and 0.39 g of sodium lauryl sulfate to obtain a mixed solution (c).

Subsequently, a 60-L reactor was charged with 23 kg of ion-exchange water, heated to 80° C., and charged with the mixed solution (c) and 6.6 kg of methyl methacrylate, 0.13 kg of methyl acrylate, 40 g of lauroyl peroxide, and 135 g of 2-ethylhexyl thioglycolate.

Then, suspension polymerization was performed with the temperature kept at approximately 80° C. After observation of an exothermic peak, the temperature was raised to 92° C. at a rate of 1° C./min, and the temperature of 92° C. to 94° C. was maintained for 30 minutes. Then, the temperature was dropped to 80° C. at a rate of 1° C./min. Subsequently, the reactor was charged with 15.9 kg of methyl methacrylate, 0.63 kg of methyl acrylate, 30 g of lauroyl peroxide, and 20 g of n-octylmercaptan. Subsequently, suspension polymerization was performed with the temperature kept at approximately 80° C.

After observation of an exothermic peak, the temperature was raised to 92° C. at a rate of 1° C./min, and the polymer was then aged for 60 minutes to substantially terminate the polymerization reaction.

Subsequently, the reactor was cooled to 50° C. and charged with 20% by mass of sulfuric acid for the dissolution of the suspending agent. Then, the polymerization reaction solution was sifted through a 1.68-mm mesh sieve to remove aggregates. The obtained polymer in the form of beads was subjected to washing, dehydration, and drying treatments to obtain fine polymer particles.

The obtained fine polymer particles were melt-kneaded in a φ30 mm twin-screw extruder set to 240° C., and the strands were cooled and cut to obtain methacrylic resin pellets (A-3).

The obtained methacrylic resin pellets had a compositional ratio of MMA/MA=96.5/3.5 wt %, Mw of 135000, and MFR of 1.1 g/10 min.

The abundance (%) of the component having a molecular weight that was 5 times or more lower than Mp was 28.5%, and the abundance (%) of the component having a molecular weight of 250000 or higher was 17.5%.

The rate of decrease in mass (%) in the TG-DTA measurement was 2.5%, and the extrapolated onset temperature (° C.) in the DSC measurement was 107.5° C.

Production Example 4

A container having a stirrer was charged with 2 kg of ion-exchange water, 65 g of calcium phosphate, 39 g of calcium carbonate, and 0.39 g of sodium lauryl sulfate to obtain a mixed solution (d).

Subsequently, a 60-L reactor was charged with 23 kg of ion-exchange water, heated to 80° C., and charged with the mixed solution (d) and 7.8 kg of methyl methacrylate, 0.16 kg of methyl acrylate, 55 g of lauroyl peroxide, and 165 g of 2-ethylhexyl thioglycolate.

Then, suspension polymerization was performed with the temperature kept at approximately 80° C. After observation of an exothermic peak, the temperature was raised to 92° C. at a rate of 1° C./min, and the temperature of 92to 94° C. was maintained for 30 minutes. Then, the temperature was dropped to 80° C. at a rate of 1° C./min. Subsequently, the reactor was charged with 15.0 kg of methyl methacrylate, 0.3 kg of methyl acrylate, 25 g of lauroyl peroxide, and 18.5 g of n-octylmercaptan. Subsequently, suspension polymerization was performed with the temperature kept at approximately 80° C.

After observation of an exothermic peak, the temperature was raised to 92° C. at a rate of 1° C./min, and the polymer was then aged for 60 minutes to substantially terminate the polymerization reaction.

Subsequently, the reactor was cooled to 50° C. and charged with 20% by mass of sulfuric acid for the dissolution of the suspending agent. Then, the polymerization reaction solution was sifted through a 1.68-mm mesh sieve to remove aggregates. The obtained polymer in the form of beads was subjected to washing, dehydration, and drying treatments to obtain fine polymer particles.

The obtained fine polymer particles were melt-kneaded in a φ30 mm twin-screw extruder set to 230° C., and the strands were cooled and cut to obtain methacrylic resin pellets (A-4).

The obtained methacrylic resin pellets had a compositional ratio of MMA/MA=98.1/1.9 wt %, Mw of 127000, and MFR of 1.5 g/10 min.

The abundance (%) of the component having a molecular weight that was 5 times or more lower than Mp was 32.5%, and the abundance (%) of the component having a molecular weight of 250000 or higher was 16.5%.

The rate of decrease in mass (%) in the TG-DTA measurement was 2.9%, and the extrapolated onset temperature (° C.) in the DSC measurement was 107.3° C.

Production Example 5

A container having a stirrer was charged with 2 kg of ion-exchange water, 65 g of calcium phosphate, 39 g of calcium carbonate, and 0.39 g of sodium lauryl sulfate to obtain a mixed solution (e).

Subsequently, a 60-L reactor was charged with 26 kg of ion-exchange water, heated to 80° C., and charged with the mixed solution (e) and 21.3 kg of methyl methacrylate, 2.3 kg of methyl acrylate, 65 g of lauroyl peroxide, and 70 g of n-octylmercaptan.

Then, suspension polymerization was performed with the temperature kept at approximately 80° C. After observation of an exothermic peak, the temperature was raised to 92° C. at a rate of 1° C./min, and the polymer was aged for 60 minutes to substantially terminate the polymerization reaction.

Subsequently, the reactor was cooled to 50° C. and charged with 20% by mass of sulfuric acid for the dissolution of the suspending agent. Then, the polymerization reaction solution was sifted through a 1.68-mm mesh sieve to remove aggregates. The obtained polymer in the form of beads was subjected to washing, dehydration, and drying treatments to obtain fine polymer particles.

The obtained fine polymer particles were melt-kneaded in a φ30 mm twin-screw extruder set to 220° C., and the strands were cooled and cut to obtain methacrylic resin pellets (A-5).

The obtained methacrylic resin pellets had a compositional ratio of MM&/MA=90/10 wt %, Mw of 92000, and MFR of 9.0 g/10 min.

The abundance (%) of the component having a molecular weight that was 5 times or more lower than Mp was 4.6%, and the abundance (%) of the component having a molecular weight of 250000 or higher was 4.5%.

The rate of decrease in mass (%) in the TG-DTA measurement was 1.4%, and the extrapolated onset temperature (° C.) in the DSC measurement was 101.5° C.

Production Example 6

A container having a stirrer was charged with 2 kg of ion-exchange water, 65 g of calcium phosphate, 39 g of calcium carbonate, and 0.39 g of sodium lauryl sulfate to obtain a mixed solution (f).

Subsequently, a 60-L reactor was charged with 23 kg of ion-exchange water, heated to 80° C., and charged with the mixed solution (f) and 2.3 kg of methyl methacrylate, 16 g of lauroyl peroxide, and 45 g of 2-ethylhexyl thioglycolate.

Then, suspension polymerization was performed with the temperature kept at approximately 80° C. After observation of an exothermic peak, the temperature was raised to 92° C. at a rate of 1° C./min, and the temperature of 92° C. to 94° C. was then maintained for 30 minutes. Then, the temperature was dropped to 80° C. at a rate of 1° C./min. Subsequently, the reactor was charged with 19.2 kg of methyl methacrylate, 2.1 kg of methyl acrylate, 40 g of lauroyl peroxide, and 45 g of n-octylmercaptan. Subsequently, suspension polymerization was performed with the temperature kept at approximately 80° C.

After observation of an exothermic peak, the temperature was raised to 92° C. at a rate of 1° C./min, and the polymer was then aged for 60 minutes to substantially terminate the polymerization reaction.

Subsequently, the reactor was cooled to 50° C. and charged with 20% by mass of sulfuric acid for the dissolution of the suspending agent. Then, the polymerization reaction solution was sifted through a 1.68-mm mesh sieve to remove aggregates. The obtained polymer in the form of beads was subjected to washing, dehydration, and drying treatments to obtain fine polymer particles.

The obtained fine polymer particles were melt-kneaded in a φ30 ram twin-screw extruder set to 230° C., and the strands were cooled and cut to obtain methacrylic resin pellets (A-6).

The obtained methacrylic resin pellets had a compositional ratio of MMA/MA=91.0/9.0 wt %, Mw of 116000, and MFR of 4.5 g/10 min.

The abundance (%) of the component having a molecular weight that was 5 times or more lower than Mp was 7.9%, and the abundance (%) of the component having a molecular weight of 250000 or higher was 8.1%.

The rate of decrease in mass (%) in the TG-DTA measurement was 1.6%, and the extrapolated onset temperature (° C.) in the DSC measurement was 102.3° C.

Production Example 7

A container having a stirrer was charged with 2 kg of ion-exchange water, 65 g of calcium phosphate, 30 g of calcium carbonate, and 0.39 g of sodium lauryl sulfate to obtain a mixed solution (g).

Subsequently, a 60-L reactor was charged with 23 kg of ion-exchange water, heated to 30° C., and charged with the mixed solution (g) and 7.96 kg of methyl methacrylate, 55 g of lauroyl peroxide, and 165 g of 2-ethylhexyl thioglycolate.

Then, suspension polymerization was performed with the temperature kept at approximately 80° C. After observation of an exothermic peak, the temperature was raised to 92° C. at a rate of 1° C./min, and the temperature of 92° C. to 94° C. was maintained for 30 minutes. Then, the temperature was dropped to 80° C. at a rate of 1° C./min. Subsequently, the reactor was charged with 15.0 kg of methyl methacrylate, 0.2 kg of styrene, 0.1 kg of N-phenylmaleimide, 25 g of lauroyl peroxide, and 18.5 g of n-octylmercaptan. Subsequently, suspension polymerization was performed with the temperature kept at approximately 80° C.

After observation of an exothermic peak, the temperature was raised to 92° C. at a rate of 1° C./min, and the polymer was then aged for 60 minutes to substantially terminate the polymerization reaction.

Subsequently, the reactor was cooled to 50° C. and charged with 20% by mass of sulfuric acid for the dissolution of the suspending agent. Then, the polymerization reaction solution was sifted through a 1.68-mm mesh sieve to remove aggregates. The obtained polymer in the form of beads was subjected to washing, dehydration, and drying treatments to obtain fine polymer particles.

The obtained fine polymer particles were melt-kneaded in a φ30 mm twin-screw extruder set to 230° C., and the strands were cooled and cut to obtain methacrylic resin pellets (A-7).

The obtained methacrylic resin pellets had a compositional ratio of MMA/St/PhMI=98.7/0.86/0.44 wt %, Mw of 123000, and MFR of 1.4 g/10 min.

The abundance (%) of the component having a molecular weight that was 5 times or more lower than Mp was 33.5%, and the abundance (%) of the component having a molecular weight of 250000 or higher was 16.2%.

The rate of decrease in mass (%) in the TG-DTA measurement was 3.2%, and the extrapolated onset temperature (° C.) in the DSC measurement was 108.5° C.

Production Example 8

A container having a stirrer was charged with 2 kg of ion-exchange water, 65 g of calcium phosphate, 39 g of calcium carbonate, and 0.39 g of sodium lauryl sulfate to obtain a mixed solution (h).

Subsequently, a 60-L reactor was charged with 23 kg of ion-exchange water, heated to 80° C., and charged with the mixed solution (h) and 6.6 kg of methyl methacrylate, 0.13 kg of ethyl acrylate, 40 g of lauroyl peroxide, and 135 g of 2-ethylhexyl thioglycolate.

Then, suspension polymerization was performed with the temperature kept at approximately 80° C. After observation of an exothermic peak, the temperature was raised to 92° C. at a rate of 1° C./min, and the temperature of 92° C. to 94° C. was maintained for 30 minutes. Then, the temperature was dropped to 80° C. at a rate of 1° C./min. Subsequently, the reactor was charged with 15.9 kg of methyl, methacrylate, 0.63 kg of ethyl acrylate, 30 g of lauroyl peroxide, and 20 g of n-octylmercaptan. Subsequently, suspension polymerization was performed with the temperature kept at approximately 80° C.

After observation of an exothermic peak, the temperature was raised to 92° C. at a rate of 1° C./min, and the polymer was then aged for 60 minutes to substantially terminate the polymerization reaction.

Subsequently, the reactor was cooled to 50° C. and charged with 20% by mass of sulfuric acid for the dissolution of the suspending agent. Then, the polymerization reaction solution was sifted through a 1.68-mm mesh sieve to remove aggregates. The obtained polymer in the form of beads was subjected to washing, dehydration, and drying treatments to obtain fine polymer particles.

The obtained fine polymer particles were melt-kneaded in a φ30 mm twin-screw extruder set to 240° C., and the strands were cooled and cut to obtain methacrylic resin pellets (A-8).

The obtained methacrylic resin pellets had a compositional ratio of MMA/EA=96.7/3.3 wt %, Mw of 133000, and MFR of 1.0 g/10 min.

The abundance (%) of the component having a molecular weight that was 5 times or more lower than Mp was 29.5%, and the abundance (%) of the component having a molecular weight of 250000 or higher was 17.2%.

The rate of decrease in mass (%) in the TG-DTA measurement was 2.6%, and the extrapolated onset temperature (° C.) in the DSC measurement was 106.8° C.

Production Example 9

A container having a stirrer was charged with 2 kg of ion-exchange water, 65 g of calcium phosphate, 39 g of calcium carbonate, and 0.39 g of sodium lauryl sulfate to obtain a mixed solution (i).

Subsequently, a 60-L reactor was charged with 23 kg of ion-exchange water, heated to 80° C., and charged with the mixed solution (i) and 7.96 kg of methyl methacrylate, 55 g of lauroyl peroxide, and 135 g of 2-ethylhexyl thioglycolate.

Then, suspension polymerization was performed with the temperature kept at approximately 80° C. After observation of an exothermic peak, the temperature was raised to 92° C. at a rate of 1° C./min, and the temperature of 92° C. to 94° C. was maintained for 30 minutes. Then, the temperature was dropped to 80° C. at a rate of 1° C./min. Subsequently, the reactor was charged with 11.0 kg of methyl methacrylate, 1.5 kg of styrene, 3.5 kg of N-phenylmaleimide, 35 g of lauroyl peroxide, and 20 g of n-octylmercaptan. Subsequently, suspension polymerization was performed with the temperature kept at approximately 80° C. After observation of an exothermic peak, the temperature was raised to 92° C. at a rate of 1° C./min, and the polymer was then aged for 60 minutes to substantially terminate the polymerization reaction.

Subsequently, the reactor was cooled to 50° C. and charged with 20% by mass of sulfuric acid for the dissolution of the suspending agent. Then, the polymerization reaction solution was sifted through a 1.68-mm mesh sieve to remove aggregates. The obtained polymer in the form of beads was subjected to washing, dehydration, and drying treatments to obtain fine polymer particles.

The obtained fine polymer particles were melt-kneaded in a φ30 mm twin-screw extruder set to 260° C., and the strands were cooled and cut to obtain methacrylic resin pellets (A-9).

The obtained methacrylic resin pellets had a compositional ratio of MMA/St/N-PhMA=79/6/15 wt %, Mw of 121000, and MFR of 1.2 g/10 min.

The abundance (%) of the component having a molecular weight that was 5 times or more lower than Mp was 32.5%, and the abundance (%) of the component having a molecular weight of 250000 or higher was 14.5%.

The rate of decrease in mass (%) in the TG-DTA measurement was 1.2%, and the extrapolated onset temperature (° C.) in the DSC measurement was 123.2° C.

Production Example 10

A container having a stirrer was charged with 2 kg of ion-exchange water, 65 g of calcium phosphate, 39 g of calcium carbonate, and 0.39 g of sodium lauryl sulfate to obtain a mixed solution (j).

Subsequently, a 60-L reactor was charged with 26 kg of ion-exchange water, heated to 80° C., and charged with the mixed solution (j) and 21.2 kg of methyl methacrylate, 0.43 kg of methyl acrylate, 27 g of lauroyl peroxide, and 85 g of n-octylmercaptan.

Then, suspension polymerization was performed with the temperature kept at approximately 80° C. After observation of an exothermic peak, the temperature was raised to 92° C.

at a rate of 1° C./min, and the polymer was aged for 60 minutes to substantially terminate the polymerization reaction.

Subsequently, the reactor was cooled to 50° C. and charged with 20% by mass of sulfuric acid for the dissolution of the suspending agent. Then, the polymerization reaction solution was sifted through a 1.68-mm mesh sieve to remove aggregates. The obtained polymer in the form of beads was subjected to washing, dehydration, and drying treatments to obtain fine polymer particles.

The obtained fine polymer particles were melt-kneaded in a φ30 mm twin-screw extruder set to 230° C., and the strands were cooled and cut to obtain methacrylic resin pellets (A-10).

The obtained methacrylic resin pellets had a compositional ratio of MMA/MA=98.0/2.0 wt %, Mw of 75000, and MFR of 3.1 g/10 min.

The abundance (%) of the component having a molecular weight that was 5 times or more lower than Mp was 4.5%, and the abundance (%) of the component having a molecular weight of 250000 or higher was 1.5%.

The rate of decrease in mass (%) by heat in the TG-DTA measurement was 2.0%, and the extrapolated onset temperature (° C.) in the DSC measurement was 109.7° C.

Production Example 11

A container having a stirrer was charged with 2 kg of ion-exchange water, 65 g of calcium phosphate, 39 g of calcium carbonate, and 0.39 g of sodium lauryl sulfate to obtain a mixed solution (k).

Subsequently, a 60-L reactor was charged with 26 kg of ion-exchange water, heated to 80° C., and charged with the mixed solution (k) and 5.5 kg of methyl methacrylate, 40 g of lauroyl peroxide, and 120 g of 2-ethylhexyl thioglycolate.

Then, suspension polymerization was performed with the temperature kept at approximately 80° C. An exothermic peak was observed 90 minutes after the charging of the raw materials. Then, the temperature was raised to 92° C. at a rate of 1° C./min, and the temperature of 92° C. to 94° C. was then maintained for 30 minutes.

Then, the temperature was dropped to 80° C. at a rate of 1° C./min. Subsequently, the reactor was charged with 16.5 kg of methyl methacrylate, 0.41 kg of methyl acrylate, 20 g of lauroyl peroxide, and 30 g of n-octylmercaptan. Subsequently, suspension polymerization was performed with the temperature kept at approximately 80° C. An exothermic peak was observed 95 minutes after the charging of the raw materials.

Then, the temperature was raised to 92° C. at a rate of 1° C./min, and the polymer was then aged for 60 minutes to substantially terminate the polymerization reaction.

Subsequently, the reactor was cooled to 50° C. and charged with 20% by mass of sulfuric acid for the dissolution of the suspending agent. Then, the polymerization reaction solution was sifted through a 1.68-mm mesh sieve to remove aggregates. The obtained polymer in the form of beads was subjected to washing, dehydration, and drying treatments to obtain fine polymer particles.

The obtained fine polymer particles were melt-kneaded in a φ30 mm twin-screw extruder set to 230° C., and the strands were cooled and cut to obtain methacrylic resin pellets (A-11).

The obtained methacrylic resin pellets had a compositional ratio of MMA/MA=98.1/1.9 wt %, Mw of 113000, and MFR of 1.8 g/10 min.

The abundance (%) of the component having a molecular weight that was 5 times or more lower than Mp was 22.5%, and the abundance (%) of the component having a molecular weight of 250000 or higher was 10.5%.

The rate of decrease in mass (%) by heat in the TG-DTA measurement was 3.5%, and the extrapolated onset temperature (° C.) in the DSC measurement was 108.7° C.

Examples 1 to 8 and Comparative Examples 1 to 3

100% by mass of the methacrylic resin obtained in each of Production Examples 1 to 11 was used in injection molding at 220° C. to 240° C. to produce a molded article having a strip shape of 127 mm×12.7 mm×3.2 mmt.

After the molding, humidity control was performed by the method described in the non-contact hot plate welding method described above to adjust the water absorption rate of the molded article. Then, the water absorption rate was measured using a moisture meter.

The molded article (corresponding to test specimen 1) was used in the evaluation of the welded surface by the non-contact hot plate welding method (evaluation of bubble generation), the measurement and evaluation of resistance to thermal decomposition, and the appearance evaluation of the welded surface.

As for the measurement and evaluation of the spiral length and the evaluation of the meltability of the methacrylic resin in no contact with a hot plate (measurement of extrapolated onset temperature by TGA) as mentioned above, the methacrylic resin pellets of Production Examples mentioned above were measured and evaluated.

The measurement results are shown in Table 1 below.

Example 9

100% by mass of the methacrylic resin pellets (A-4) of Production Example 4 was used in injection molding at 230° C. to produce a molded article having a strip shape of 127 mm×12.7 mm×3.2 mmt.

Humidity control was performed for 240 hours under conditions of 23° C. and 50% RH to adjust the water absorption rate of the molded article. Then, the water absorption rate was measured using a moisture meter to obtain test specimen 1.

The molded article (corresponding to test specimen 1) was used in the evaluation of the welded surface by the non-contact hot plate welding method (evaluation of bubble generation), the measurement and evaluation of resistance to thermal decomposition, and the appearance evaluation of the welded surface.

As for the measurement and evaluation of the spiral length and the evaluation of the meltability of the methacrylic resin in no contact with a hot plate (measurement of extrapolated onset temperature by TGA) as mentioned above, the methacrylic resin pellets of Production Examples mentioned above were measured and evaluated.

The molded article of the methacrylic resin pellets (A-4) was welded with a molded article of an ABS resin to prepare a welded molded article.

Example 10

100% by mass of the methacrylic resin pellets (A-4) of Production Example 4 was used in injection molding at 230° C. to produce a molded article having a strip shape of 127 mm×12.7 mm×3.2 mmt.

Humidity control was performed for 48 hours under conditions of 23° C. and 50% RH. The water absorption rate was measured using a moisture meter to obtain test specimen 1.

Then, as shown in FIG. 1, test specimen 1 was placed in movable fixture 2 capable of moving in the upward and downward directions (in FIG. 1, directions indicated by the arrows), then moved close to hot plate 3 heated to 550° C. with a clearance of 0.4 mm via the movable fixture 2, and left standing for 20 seconds. Bubble generation was evaluated by the method described in the paragraph <2. Non-contact hot plate welding method>.

Also, the measurement and evaluation of resistance to thermal decomposition and the appearance evaluation of the welded surface were conducted.

As for the measurement and evaluation of the spiral length and the evaluation of the meltability of the methacrylic resin in no contact with a hot plate (measurement of extrapolated onset temperature by TGA) as mentioned above, the methacrylic resin pellets of Production Examples mentioned above were measured and evaluated.

The molded article of the methacrylic resin pellets (A-4) was welded with a molded article of an ABS resin to prepare a welded molded article.

TABLE 1

| | | Example 1 | Example 2 | Example 3 | Example 4 | Example 5 | Example 6 | Example 7 |
|---|---|---|---|---|---|---|---|---|
| Methacrylic resin (mass %) | A-1 | 100 | | | | | | |
| | A-2 | | 100 | | | | | |
| | A-3 | | | 100 | | | | |
| | A-4 | | | | 100 | | | |
| | A-5 | | | | | | | |
| | A-6 | | | | | | | |
| | A-7 | | | | | 100 | | |
| | A-8 | | | | | | 100 | |
| | A-9 | | | | | | | 100 |
| | A-10 | | | | | | | |
| | A-11 | | | | | | | |
| Evaluation by non-contact hot plate welding method | | ○ | ◎ | ◎ | ◎ | ◎ | ◎ | ◎ |
| Spiral length (cm) | | 26.5 | 27.5 | 31.5 | 33.5 | 33.0 | 31.0 | 28.5 |
| Rate of decrease in mass (%) in TG-DTA | | 2.0 | 2.3 | 2.5 | 2.9 | 3.2 | 2.6 | 1.2 |
| Extrapolated onset temperature (° C.) of glass transition temperature in DSC measurement | | 110.5 | 107.1 | 107.5 | 107.3 | 108.5 | 106.8 | 123.2 |
| Abundance (%) of component having molecular weight of 250000 or higher | | 5.0 | 23 | 17.5 | 16.5 | 16.2 | 17.2 | 14.5 |
| Water absorption rate (mass %) of molded test specimen | | 0.2 | 0.2 | 0.2 | 0.2 | 0.2 | 0.2 | 0.3 |
| Appearance evaluation of welded surface | | Δ | ○ | ○ | ○ | ○ | ○ | Δ |

| | | Example 8 | Example 9 | Example 10 | Comparative Example 1 | Comparative Example 2 | Comparative Example 3 |
|---|---|---|---|---|---|---|---|
| Methacrylic resin (mass %) | A-1 | | | | | | |
| | A-2 | | | | | | |
| | A-3 | | | | | | |
| | A-4 | | 100 | 100 | | | |
| | A-5 | | | | 100 | | |
| | A-6 | | | | | 100 | |
| | A-7 | | | | | | |
| | A-8 | | | | | | |
| | A-9 | | | | | | |
| | A-10 | | | | | | 100 |
| | A-11 | 100 | | | | | |
| Evaluation by non-contact hot plate welding method | | ○ | ○ | ○ | X | X | X |
| Spiral length (cm) | | 32.5 | 33.5 | 33.5 | 38.0 | 28.0 | 33.5 |
| Rate of decrease in mass (%) in TG-DTA | | 3.5 | 2.9 | 2.9 | 1.4 | 1.6 | 2.0 |
| Extrapolated onset temperature (° C.) of glass transition temperature in DSC measurement | | 108.7 | 107.3 | 107.3 | 101.5 | 102.3 | 109.7 |

TABLE 1-continued

| Abundance (%) of component having molecular weight of 250000 or higher | 10.5 | 16.5 | 16.5 | 4.5 | 8.1 | 1.5 |
|---|---|---|---|---|---|---|
| Water absorption rate (mass %) of molded test specimen | 0.2 | 0.55 | 0.2 | 0.2 | 0.2 | 0.2 |
| Appearance evaluation of welded surface | Δ | Δ | Δ | X | X | X |

In Example 1, because MFR was appropriate, small bubbles were confirmed only to a small extent during melting by the non-contact hot plate welding method, and the appearance of the joined part was also favorable.

In Examples 2 to 4, because MFR was appropriate and the abundance (%) of the component having a molecular weight that was 5 times or more lower than a peak top molecular weight (Mp) was in a more preferred range as compared with Example 1, no bubble or foam was confirmed during melting by the non-contact hot plate melting method, and the appearance of the joined part was very favorable.

In Examples 5 and 6, the methacrylic acid ester monomer was copolymerized with a monomer other than methyl acrylate used as at least one additional vinyl monomer copolymerizable with the methacrylic acid ester monomer. However, because MFR was appropriate and the abundance (%) of the component having a molecular weight that was 5 times or more lower than a peak top molecular weight (Mp) was in a preferred range, no bubble or foam was confirmed during melting by the non-contact hot plate melting method, and the appearance of the joined part was very favorable.

In Example 7, the extrapolated onset temperature (° C.) of a glass transition temperature in the DSC measurement was slightly high, and the appearance of the joined part had slight roughness as compared with the other Examples, but was sufficiently favorable for practical use.

In Example 8, the abundance (%) of the component having a molecular weight of 250000 or higher was slightly small, and small bubbles were confirmed to a small extent as compared with the other Examples. However, the welded molded article had a favorable level for practical use.

In Example 9, small bubbles were confirmed to a small extent, as compared with the other Examples due to the influence of the increased water absorption rate of the molded article. However, the welded molded article had a favorable level for practical use.

In Example 10, small bubbles were confirmed to a small extent as compared with the other Examples due to the evaluation conducted at a hot plate temperature as high as 550° C. for the non-contact hot plate method. However, the welded molded article had a favorable level for practical use.

On the other hand, in Comparative Example 1, MFR was considerably high, and bubbles having a diameter of 1 mm or larger were generated.

In Comparative Example 2, although the abundance (%) of the component having a molecular weight that was 5 times or more lower than a peak top molecular weight (Mp) was in a preferred range, a large number of bubbles having a diameter of 1 mm or larger were generated due to large MFR. In addition, the appearance of the welded surface was rough due to the influence of the bubble generation and was thus not preferred.

In Comparative Example 3, although MFR was 3.1 g/10 min which was close to 2.5 g/10 min, bubbles having a diameter of 1 mm or larger were generated, and the appearance of the welded surface was also rough.

The present application is based on Japanese Patent Application No. 2014-185492 filed in the Japan Patent Office on Sep. 11, 2014, the contents of which are incorporated herein by reference.

INDUSTRIAL APPLICABILITY

The methacrylic resin composition of the present invention has industrial applicability as a raw material for a member for a vehicle, such as a taillight cover, a headlight cover, or a meter panel.

REFERENCE SIGNS LIST

1: test specimen
2: movable fixture
3: hot plate

The invention claimed is:
1. A molded article comprising a molded article (A) welded with an additional molded article (B),
   the molded article (A) comprising a methacrylic resin comprising 96.5 to 99.9% by mass of a methacrylic acid ester monomer unit and 0.1 to 3.5% by mass of a unit of at least one additional vinyl monomer copolymerizable with the methacrylic acid ester monomer, wherein
   the methacrylic resin possesses
   an abundance of a component having a molecular weight of 250000 or higher obtained from a GPC elution curve is 14% or more of a GPC area, and
   the molded article (A) has a melt flow rate (MFR) of 2.5 g/10 min or lower at 230° C. at a load of 3.8 kg and spiral length of 31 cm or higher, and
   wherein said methacrylic resin during melting in a non-contact hot plate welding method to at least 500° C., suppresses a generation of bubbles therein having a diameter of 1 mm or larger.
2. The molded article according to claim 1, wherein the methacrylic resin possesses
   a weight-average molecular weight of 300000 or lower as measured by gel permeation chromatography (GPC), and
   contains 6 to 50% of a component having a molecular weight that is 5 times or more lower than a peak top molecular weight (Mp) obtained from a GPC elution curve.
3. The molded article according to claim 1, wherein the methacrylic resin has an extrapolated onset temperature (° C.) of 120° C. or lower as determined from a glass transition curve obtained by heating from 40° C. to 210° C. at a heating rate of 10° C/min according to JIS-K-7121 with a-alumina as a reference in a nitrogen gas atmosphere using a differential scanning calorimeter (DSC).

4. The molded article according to claim 1, wherein the molded article (A) has a water absorption rate of 0.5% by mass or lower.

5. A molded article comprising a molded article (A) welded with an additional molded article (B),
the molded article (A) comprising a methacrylic resin comprising 96.5 to 99.9% by mass of a methacrylic acid ester monomer unit and 0.1 to 3.5% by mass of a unit of at least one additional vinyl monomer copolymerizable with the methacrylic acid ester monomer, wherein
the methacrylic resin possesses
an abundance of a component having a molecular weight of 250000 or higher obtained from a GPC elution curve is 14% or more of a GPC area, and
the molded article (A) has a melt flow rate (MFR) of 2.5 g/10 min or lower at 230° C. at a load of 3.8 kg and spiral length of 31 cm or higher, and
wherein the molded article (B) is a molded article of an ABS-based resin.

* * * * *